(12) United States Patent
Singh et al.

(10) Patent No.: US 6,947,633 B2
(45) Date of Patent: Sep. 20, 2005

(54) DISPERSION COMPENSATION

(75) Inventors: Harmeet Singh, Acton, MA (US); Hamid R. Khazaei, Westford, MA (US)

(73) Assignee: OptoVia Corporation, Acton, MA (US)

( * ) Notice: Subject to any disclaimer, the term of this patent is extended or adjusted under 35 U.S.C. 154(b) by 179 days.

(21) Appl. No.: 10/281,934

(22) Filed: Oct. 28, 2002

(65) Prior Publication Data

US 2004/0081393 A1 Apr. 29, 2004

(51) Int. Cl.⁷ .............................. G02B 6/26; G02B 6/42
(52) U.S. Cl. ........................................... 385/27; 385/24
(58) Field of Search ............................... 385/24, 27, 14, 385/17–18, 39–40, 129–131; 398/118, 130, 79, 81–82

(56) References Cited

U.S. PATENT DOCUMENTS

| | | |
|---|---|---|
| 5,596,448 A | 1/1997 | Onaka et al. |
| 5,608,562 A | 3/1997 | Delavaux et al. |
| 5,633,741 A | 5/1997 | Giles |
| 5,715,265 A | 2/1998 | Epworth |
| 5,768,450 A | 6/1998 | Bhagavatula |
| 5,949,926 A | 9/1999 | Davies |
| 5,974,206 A | 10/1999 | Bricheno et al. |
| 5,982,963 A | 11/1999 | Feng et al. |
| 6,104,515 A | 8/2000 | Cao |
| 6,122,421 A | 9/2000 | Adams et al. |
| 6,148,127 A | 11/2000 | Adams et al. |
| 6,222,957 B1 | 4/2001 | Lin et al. |
| 6,271,952 B1 | 8/2001 | Epworth |
| 6,292,603 B1 | 9/2001 | Mizuochi et al. |
| 6,295,396 B1 | 9/2001 | Chao et al. |
| 6,304,696 B1 | 10/2001 | Patterson et al. |
| 6,334,013 B1 | 12/2001 | Laming et al. |
| 6,356,684 B1 | 3/2002 | Patterson et al. |
| 6,363,184 B2 | 3/2002 | Cao |
| 6,374,013 B1 | 4/2002 | Whiteaway et al. |
| 6,390,633 B2 | 5/2002 | Shirasaki et al. |
| 6,392,807 B1 | 5/2002 | Barbarossa et al. |
| 6,393,188 B1 | 5/2002 | Jeong et al. |
| 6,441,959 B1 | 8/2002 | Yang et al. |
| 6,515,779 B2 * | 2/2003 | Fee .............................. 398/147 |
| 6,580,542 B1 * | 6/2003 | Song et al. .................. 398/147 |
| 2002/0181869 A1 * | 12/2002 | Lin .............................. 385/37 |

OTHER PUBLICATIONS

Michael C. Parker et al., "Design of Arrayed–Waveguide Gratings Using Hybrid Fourier–Fresnel Transform Techniques", *IEEE Journal of Selected Topics in Quantum Electronics*, vol. 5, No. 5, pp. 1379–1384 (Sep./Oct. 1999).

Michael C. Parker et al., "Applications of Active Arrayed–Waveguide Gratings in Dynamic WDM Networking and Routing", *Journal of Lightwave Technology*, vol. 18, No. 12, pp. 1749–1756 (Dec. 2000).

Michael C. Parker et al., "Adaptive chromatic dispersion controller based on an electro–optically chirped arrayed–waveguide grating", pp. 257–259.

(Continued)

*Primary Examiner*—Karl D. Frech
*Assistant Examiner*—Lisa Caputo
(74) *Attorney, Agent, or Firm*—Fish & Richardson P.C.

(57) ABSTRACT

A tunable dispersion compensator that includes a free propagation region and an adjustment region. The free propagation region includes a first end and a second end, and allows an input lightwave signal having component signals with different wavelengths to propagate from the first end to the second end. The adjustment region directs the input lightwave into portions of the input lightwave, adjusts a characteristic of the portions of the input lightwave signal at the second end, and directs the adjusted portions of the input lightwave signal back towards the first end. The adjusted portions of the input lightwave signal combine at the first end to generate an output lightwave signal having a phase profile that is different from a phase profile of the input lightwave signal.

61 Claims, 18 Drawing Sheets

OTHER PUBLICATIONS

Arthur J. Lowery et al., "270–km 10 Gbit/s WDM dispersion compensation using a chirped AWGM", pp. 74–76.

Katsunari Okamoto, "Silica Waveguide Devices", *Integrated Optical Circuits and Components Design and Applications*, pp. 55–88 (1999).

B. Malo et al., "Apodised in–fibre Bragg grating reflectors photoimprinted using a phase mask", *Electronics Letters*, vol. 31, No. 3, pp. 223–225 (Feb. 2, 1995).

Y.P. Li et al., "Silica–based optical integrated circuits", *IEE Proceedings Optoelectronics*, vol. 143, No. 5, pp. 263–280 (Oct. 1996).

Anat Sneh et al., "Indium Phosphide–Based Photonic Circuits and Components", *Integrated Optical Circuits and Components Design and Applications*, pp. 161–237 (1999).

R.C. Alferness, "Titanium–Diffused Lithium Niobate Waveguide Devices", *Guided–Wave Optoelectronics*, Second Edition, pp. 145–210 (1988 and 1990).

T. Zinke et al., "Comparison of optical waveguide losses in silicon–on–insulator", *Electronics Letters*, vol. 29, No. 23, pp. 2031–2033 (Nov. 11, 1993).

A.B. Seddon, "Sol–gel derived organic–inorganic hybrid materials for photonic applications", *IEE Proceedings Circuits, Devices and Systems*, vol. 145, No. 5, pp. 369–372 (Oct. 1998).

S. Iraj Najafi et al., "Sol–Gel Glass Waveguide and Grating on Silicon", *Journal of Lightwave Technology*, vol. 16, No. 9, pp. 1640–1646 (Sep. 1998).

F. Michelotti, "Linear and Nonlinear Optical Properties of Polymer Waveguides", *Advances in Integrated Optics*, pp. 173–184 (1994).

D. Delacourt, "Integrated Optics on Lithium Niobate", *Advances in Integrated Optics*, pp. 79–93 (1994).

A. Carenco, "Advances in Semiconductor Integrated Optics", *Advances in Integrated Optics*, pp. 109–119 (1994).

R.R.A. Syms, "Silica–on Silicon Integrated Optics", *Advances in Integrated Optics*, pp. 121–150 (1994).

* cited by examiner

DISPERSION COMPENSATION

TECHNICAL FIELD

This invention relates to dispersion compensation.

BACKGROUND

A fiber optic communication system allows lightwave signals to be transmitted over long distances. The fiber optic communication system may include a transmitter that generates signals in the form of lightwave pulses, a receiver for receiving the lightwave pulses, and an optical fiber that connects the transmitter to the receiver. The lightwave pulses are generated by a laser that emits light having a band of wavelengths around a center wavelength. Because the speed of light through the fiber is a function of the wavelength (commonly referred to as chromatic dispersion), the components of a lightwave pulse having different wavelengths propagate through the fiber at slightly different speeds, resulting in a wider pulse at the receiver than was transmitted. The wider pulses may overlap, making it difficult to determine the boundaries of the pulses and causing errors in the detected signals.

In dense wavelength divisional multiplexing applications, several channels of signals are transmitted through the fiber at the same time. Each channel uses a band of wavelength with a different center wavelength. In order to accurately receive data, the receiver filters out the signals of a particular channel, and performs dispersion compensation to compensate for the chromatic dispersion effects. Dispersion compensation can also be applied prior to transmission. The signals are modified at the transmission end so that after traveling through the fiber, the signals become dispersion free at the receiving end.

SUMMARY

In general, in one aspect, the invention is directed towards a tunable dispersion compensator that includes a free propagation region and an adjustment region. The free propagation region includes a first end and a second end, and allows an input lightwave signal having component signals with different wavelengths to propagate from the first end to the second end. The adjustment region directs the input lightwave into portions of the input lightwave, adjusts a characteristic of the portions of the input lightwave signal at the second end and directs the adjusted portions of the input lightwave signal back towards the first end, so that the adjusted portions of the input lightwave signal combine at the first end to generate an output lightwave signal having a phase profile that is different from a phase profile of the input lightwave signal.

Implementations of the invention may include one or more of the following features. The adjustment region includes a plurality of phase shifters having first ends optically coupled to a portion of the second end of the free propagation region to receive portions of the input lightwave signal, the phase shifters disposed to adjust the phases of portions of the lightwave signals traveling through the adjustment region. The adjustment region includes waveguides having different optical lengths to couple the input lightwave signal at the second end of the flee propagation region to the tunable phase shifters. Each waveguide may form a 90 or 180 degree arc. The waveguides can have different widths resulting in different effective refractive indices, which results in different optical lengths, and each waveguide couples a portion of the input lightwave signal at the second end of the free propagation region to one of the phase shifters. The waveguides can be doped with different amounts of impurities resulting in different effective refractive indices, which results in different optical lengths, and each waveguide couples a portion of the input lightwave signal at the second end of the free propagation region to one of the phase shifters.

Implementations of the invention may also include one or more of the following features. The phase shifters are adjustable. A control module is used to measure the output lightwave signal and adjust the phase shifters to impart phase shifts to portions of the input lightwave signal to reduce dispersion in the output lightwave signal. The control module controls the tunable phase shifters based on measurements of a bit error rate of the output lightwave signal. The adjustment region includes mirrors to reflect portions of the input lightwave signal received at the second end of the free propagation region. The mirrors include dielectric-coated mirrors or Faraday rotator mirrors. The mirrors have different reflectivities so as to impart different attenuations to the portions of the input lightwave signal reflected by the mirrors. The adjustment region includes attenuators that adjust the amplitude of portions of the input lightwave signal at the second end of the free propagation region. The attenuators are adjustable. A control module is used to measure the output lightwave signal and adjust the attenuators to attenuate portions of the input lightwave signal to reduce ripple in a dispersion profile of the output lightwave signal. A semiconductor optical amplifier is used with the tunable dispersion compensator. A detector is used with the tunable dispersion compensator to convert the output lightwave signal into an electrical signal. The tunable dispersion compensator includes a waveguide to guide the input lightwave signal to the first end of the free propagation region. The free propagation region and the adjustment region are supported by a planar substrate.

In general, in another aspect, the invention is directed towards a tunable dispersion compensator that includes a waveguide and mirrors spaced apart from the waveguide. The waveguide guides an input lightwave signal having component signals with different wavelengths and directs the input lightwave signal to exit an end of the waveguide. The mirrors are oriented to reflect a portion of the input lightwave signal and positioned so that reflected lightwave signals combine to generate an output lightwave signal with a phase profile different from a phase profile of the input lightwave signal.

Implementations of the invention may include one or more of the following features. The position of each mirror is adjustable. The positions of the mirrors are adjusted to impart phase shifts to portions of the input lightwave signal to reduce dispersion in the output lightwave signal. Each mirror is initially positioned along an arc with the concave side of the arc facing towards the end of the waveguide. Each mirror comprises a microelectromechanical mirror.

In general, in another aspect, the invention is directed towards a lightwave communication system that includes a light source that generates an input lightwave signal having component signals with different wavelengths, a waveguide having an end, and mirrors spaced apart from the end of the waveguide. The waveguide guides the input lightwave signal and directs the signal to exit the waveguide through the end. The mirrors are oriented to reflect portions of the input lightwave signal and positioned so that reflected lightwave signals combine to generate an output lightwave signal with a phase profile different from a phase profile of the input lightwave signal.

Implementations of the invention may include the following feature. The system includes an amplifier to amplify the output lightwave signal.

In general, in another aspect, the invention is directed towards a lightwave communication system that includes a light source, a free propagation region, and an adjustment region. The light source generates an input lightwave signal having component signals with different wavelengths. The free propagation region allows the input lightwave signal to propagate from a first end to a second end of the free propagation region. The adjustment region directs the input lightwave into portions of the input lightwave, adjusts a characteristic of the portions of the input lightwave signal at the second end and directs the adjusted portions of the input lightwave signal back towards the first end, so that the adjusted portions of the input lightwave signal combine at the first end to generate an output lightwave signal having a phase profile that is different from a phase profile of the input lightwave signal.

Implementations of the invention may include the following feature. The system includes an amplifier that amplifies the output lightwave signal.

In general, in another aspect, the invention is directed towards a tunable dispersion compensator that includes a substrate, a first set of waveguides supported by the substrate that receives input lightwave signals, and a dielectric slab supported by the substrate that has a first end and a second end. The first end is coupled to the first set of waveguides to receive the input lightwave signals. The dielectric slab allows the input lightwave to propagate from the first end to the second end. The tunable dispersion compensator also includes an adjustment region supported by the substrate and coupled to the second end of the dielectric slab. The adjustment region directs the input lightwave into portions of the input lightwave and adjusts a characteristic of the portions of the input lightwave signal at the second end of the dielectric slab, and directs the adjusted portions of the input lightwave signal back towards the first end, so that the adjusted portions of the input lightwave signal combine at the first end to generate an output lightwave signal having a phase profile that is different from a phase profile of the input lightwave signal.

Implementations of the invention may include one or more of the following features. The adjustment region includes a second set of waveguides having different optical lengths. The adjustment region includes an array of tunable phase shifters, each tunable phase shifter imparts phase shift to light waves traveling through a corresponding one of the second set of waveguides. The adjustment region includes an array of optical attenuators, each optical attenuator attenuates light waves traveling through a corresponding one of the second set of waveguides. The adjustment region includes an array of mirrors, each mirror reflects light waves traveling through a corresponding one of the second set of waveguides.

In general, in another aspect, the invention is directed towards a demultiplexer that includes a substrate, an input waveguide, first and second output waveguides, a propagation region, an array of waveguides having different optical lengths, and an array of tunable phase shifters. The input and output waveguides, the propagation region, the array of waveguides, and the array of phase shifters are supported by the substrate. The input waveguide receives an input lightwave signal that includes signals from a first channel and a second channel. The free propagation region has a first end and a second end, and allows the input lightwave signal to expand in a direction transverse to a propagation direction as the signal propagates from the first end to the second end. The first end is coupled to the input and output waveguides. The array of waveguides have first ends coupled to the second end of the propagation region, and each waveguide corresponds to a tunable phase shifter. The tunable dispersion compensator also includes optics to redirect lightwave signals that propagate in a forward direction through the array of waveguides and the array of tunable phase shifters so that redirected lightwave signals propagate in a reverse direction through the tunable phase shifters and the array of waveguides and from the second end to the first end of the slab. The propagation region, the array of waveguides, and the array of tunable phase shifters are configured so that signals from the first channel recombine at the first end of the propagation region and enter the first output waveguide, and signals from the second channel recombine at the first end of the propagation region and enter the second output waveguide. The tunable phase shifters are controlled to impart phase shifts to the input lightwave signal so that the signals in the first and second output waveguides have dispersion that is different from the input lightwave signal.

Implementations of the invention may include the following feature. The tunable dispersion compensator includes an array of tunable attenuators, each corresponding to a waveguide of the array, the tunable attenuators controlled to impart different amounts of attenuations to different portions of the input lightwave signal to reduce ripple in the dispersion profiles of the signals in the first and second output waveguides In general, in another aspect, the invention is directed towards a gain flattening filter that includes a free propagation region and an adjustment region. The free propagation region allows an input lightwave signal having a band of wavelengths to propagate from a first end to a second end of the free propagation region. The adjustment region directs the input lightwave into portions of the input lightwave, adjusts a characteristic of the portions of the input lightwave signal at the second end, and directs the adjusted portions of the input lightwave signal back towards the first end so that the adjusted portions of the input lightwave signal combine at the first end to generate an output lightwave signal having an amplitude profile that is different from the amplitude profile of the input lightwave signal.

Implementations of the invention may include one or more of the following features. The adjustment region includes an array of waveguides having different optical lengths, each waveguide having a first end coupled to the second end of the free propagation region. The adjustment region includes an array of optical attenuators, each optical attenuator attenuates light waves traveling through a corresponding one of the waveguides in the array of waveguides. The optical attenuators impart an attenuation profile that is complementary to a gain profile of an optical amplifier.

In general, in another aspect, the invention is directed towards a tunable dispersion compensator that includes a planar substrate, means for guiding an input lightwave signal above the substrate, means for separating the input lightwave signal into components having different wavelengths so that the different components appear at different spatial positions above the substrate, means for redirecting the input lightwave signal so that the signal propagate in a reverse direction, means for combining the redirected lightwave signal to generate an output signal, and means for adjusting one or more characteristics of the components of the input lightwave signal so that the output signal has a phase profile different from a phase profile of the input lightwave signal.

Implementations of the invention may include the following feature. The adjusting means adjusts one or more characteristics of the components of the input lightwave signal so that the output lightwave signal has a phase profile that tends to reduce chromatic dispersion in the output lightwave signal In general, in another aspect, the invention is directed towards a method of compensating dispersion in an input lightwave signal having component signals with different wavelengths. The method includes transmitting the input lightwave signal from a first end of a free propagation region to a second end of the free propagation region, redirecting portions of the input lightwave signal at the second end so that redirected portions of input lightwave signals propagate away from the second end and combine at the first end to generate an output lightwave signal, and modifying the phases of the portions of the input lightwave signal at the second end so that the output lightwave signal has a phase profile that is different from a phase profile of the input lightwave signal.

Implementations of the invention may include one or more of the following features. The method includes expanding the input lightwave signal in a direction transverse to the propagation direction of the signal as the signal propagates from the first end to the second end of the free propagation region. The method includes modifying the amplitude of the portions of the input lightwave signals.

In general, in another aspect, the invention is directed towards a method of lightwave communication that includes generating a first lightwave signal having a band of wavelengths, propagating the first lightwave signal from a first end of a free propagation region to a second end of the free propagation region, propagating the first lightwave signal from a first end of an adjustment region to a second end of the adjustment region, redirecting the first lightwave signal at the second end of the adjustment region so that redirected first lightwave signals travel front the second end of the adjustment region to the first end of the adjustment region and from the second end of the free propagation region to the first end of the free propagation region, combining the redirected first lightwave signal at the first end of the free propagation region to generate a second lightwave signal, and imparting different phase shifts to different portions of the first lightwave signal as the first lightwave signal travels through the adjustment region so that the second lightwave signal has a phase profile that is different from a phase profile of the first lightwave signal before the first lightwave signal is transmitted through the free propagation region.

Implementations of the invention may include one or more of the following features. The method includes adjusting the amount of phase shifts imparted to the different portions of the first lightwave signal so that the second lightwave signal has a different dispersion compared to the first lightwave signal before the first lightwave signal is transmitted through the free propagation region. The method includes imparting different amounts of attenuation to different portions of the first lightwave signal as the first lightwave signal travels through the adjustment region so that the second lightwave signal has an amplitude profile that is different from an amplitude profile of the first lightwave signal. The different amounts of attenuation have a profile configured to reduce the ripple in a dispersion profile of the second lightwave signal.

In general, in another aspect, the invention is directed towards a method of lightwave communication that includes receiving a first lightwave signal having a band of wavelengths, propagating the first lightwave signal from a first end of a free propagation region to a second end of the free propagation region, propagating the first lightwave signal from a first end of an adjustment region to a second end of the adjustment region, redirecting portions of the input lightwave signal at the second end so that redirected portions of input lightwave signals travel from the second end of the adjustment region to the first end of the adjustment region and from the second end of the free propagation region to the first end of the free propagation region, combining the redirected first lightwave signal at the first end of the free propagation region to generate a second lightwave signal, and imparting different phase shifts to different portions of the first lightwave signal as the first lightwave signal travels through the adjustment region so that the second lightwave signal has a phase profile that is different from a phase profile of the first lightwave signal before the first lightwave signal is transmitted through the free propagation region.

Implementations of the invention may include one or more of the following features. The method includes adjusting the amount of phase shifts imparted to the different portions of the first lightwave signal so that the second lightwave signal has a dispersion that is different compared to the first lightwave signal before the first lightwave signal is transmitted through the free propagation region. The method includes imparting different amounts of attenuation to different portions of the first lightwave signal as the first lightwave signal travels through the adjustment region so that the second lightwave signal has an amplitude profile that is different from an amplitude profile of the first lightwave signal. The different amounts of attenuation have a profile configured to reduce the ripple in a dispersion profile of the second lightwave signal. The method includes converting the second lightwave signal to an electrical signal.

In general, in another aspect, the invention is directed towards a method of adjusting a transmission profile of a first lightwave signal having a band of wavelengths. The method includes propagating the first lightwave signal from a first end of a free propagation region to a second end of the free propagation region, propagating the first lightwave signal from a first end of an adjustment region to a second end of the adjustment region, redirecting the first lightwave signal at the second end of the adjustment region so that redirected first lightwave signals travel from the second end of the adjustment region to the first end of the adjustment region and from the second end of the free propagation region to the first end of the free propagation region, combining the redirected first lightwave signal at the first end of the free propagation region to generate a second lightwave signal, and imparting different amounts of attenuation to different portions of the first lightwave signal as the first lightwave signal travels through the adjustment region so that the second lightwave signal has an amplitude profile that is different from an amplitude profile of the first lightwave signal before the first lightwave signal is transmitted through the free propagation region.

Implementations of the invention may include the following feature. The method includes adjusting the amounts of attenuation so that the attenuation imparted to the first lightwave signal has a profile that is complementary to a gain profile of an optical amplifier.

In general, in another aspect, the invention is directed towards a method of dispersion compensation that includes propagating an input lightwave signal having component signals with different wavelengths through a free propagation region, using mirrors to reflect portions of the input lightwave signal so that reflected portions of the input lightwave signal propagate away from the mirrors and combine a location to generate an output lightwave signal, and adjusting positions of the mirrors to impart different amounts of phase shift to the portions of the input lightwave signal reflected by the mirrors so that the output lightwave signal has a phase profile that is different from a phase profile of the input lightwave signal before the input lightwave signal is propagated through the free propagation region.

Implementations of the invention may include one or more of the following features. The mirrors include microelectromechanical mirrors. The method includes adjusting positions of the mirrors so that the output lightwave signal has a dispersion that is different compared to the input lightwave signal before the input lightwave signal is propagated through the free propagation region. The method includes imparting attenuation to the portions of the first lightwave signal reflected by the mirrors. The method includes adjusting the amount of attenuation imparted to the portion of the first lightwave signal reflected by each mirror to reduce the ripple in a dispersion profile of the second lightwave signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
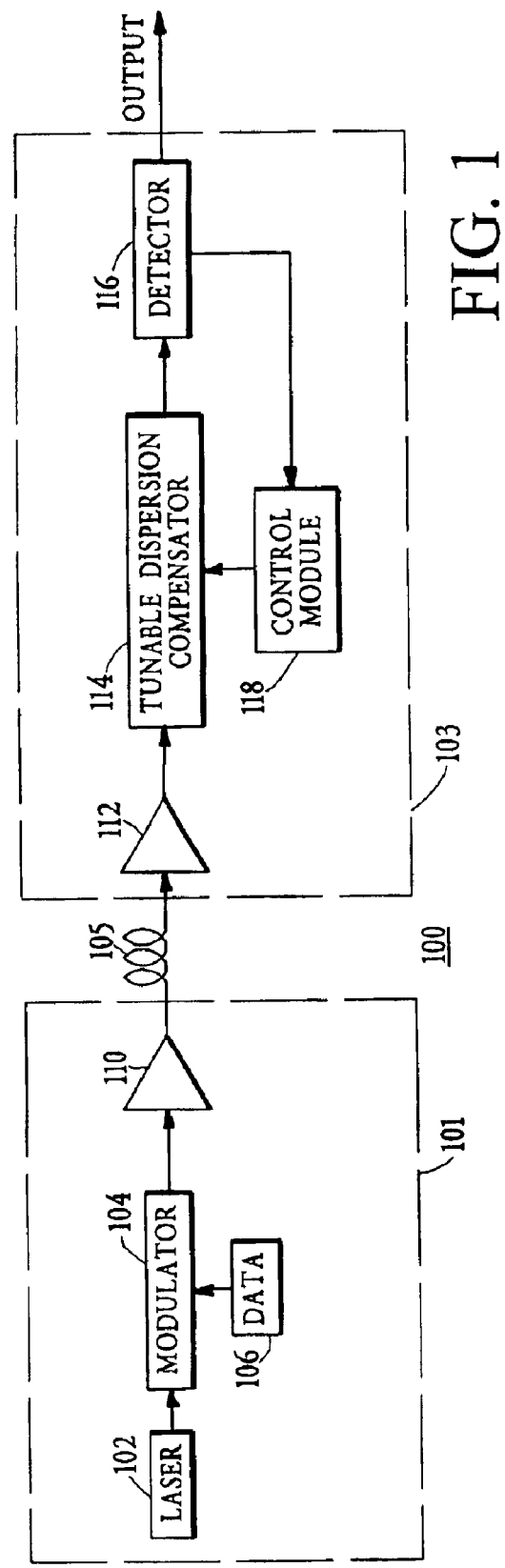
FIG. 1 is an optical communication system.

Referring to FIG. 1, an optical communication system 100 includes a transmitter 101 that transmits lightwave signals through an optical fiber 105 to a receiver 103. Transmitter 101 includes a laser 102 that generates the lightwave signals, a modulator 104 that modulates the lightwave signals according to digital data 106, and an amplifier 110 that amplifies signal levels. Receiver 103 includes an amplifier 112 and a tunable dispersion compensator 114 that adjusts the amplitude and phase of the lightwave signals to compensate dispersion effects imparted to the signals as they travel through optical fiber 105. Receiver 103 includes a detector 116 to convert the lightwave signals into electrical signals, and a control module 118 to control dispersion compensator 114 so that a proper amount of phase and amplitude adjustment is applied to the lightwave signals.

Tunable dispersion compensator 114 induces and dynamically controls chromatic dispersion in the lightwave signals that are received from fiber 105. Tunable dispersion compensator 114 is based on Fourier domain spatial filtering, and is designed to allow light waves to travel along planar structures so that components with different wavelengths can be individually adjusted. A planar waveguide (e.g., a dielectric slab waveguide) is used to allow free space expansion in one plane and guided mode propagation in the other, causing the light waves to diffract along the planar waveguide. Spatial phase shifting is used to induce relative delay in different portions of the light waves. The different portions are recombined after retro-reflection to produce a desired dispersion characteristic.

Figure 2:
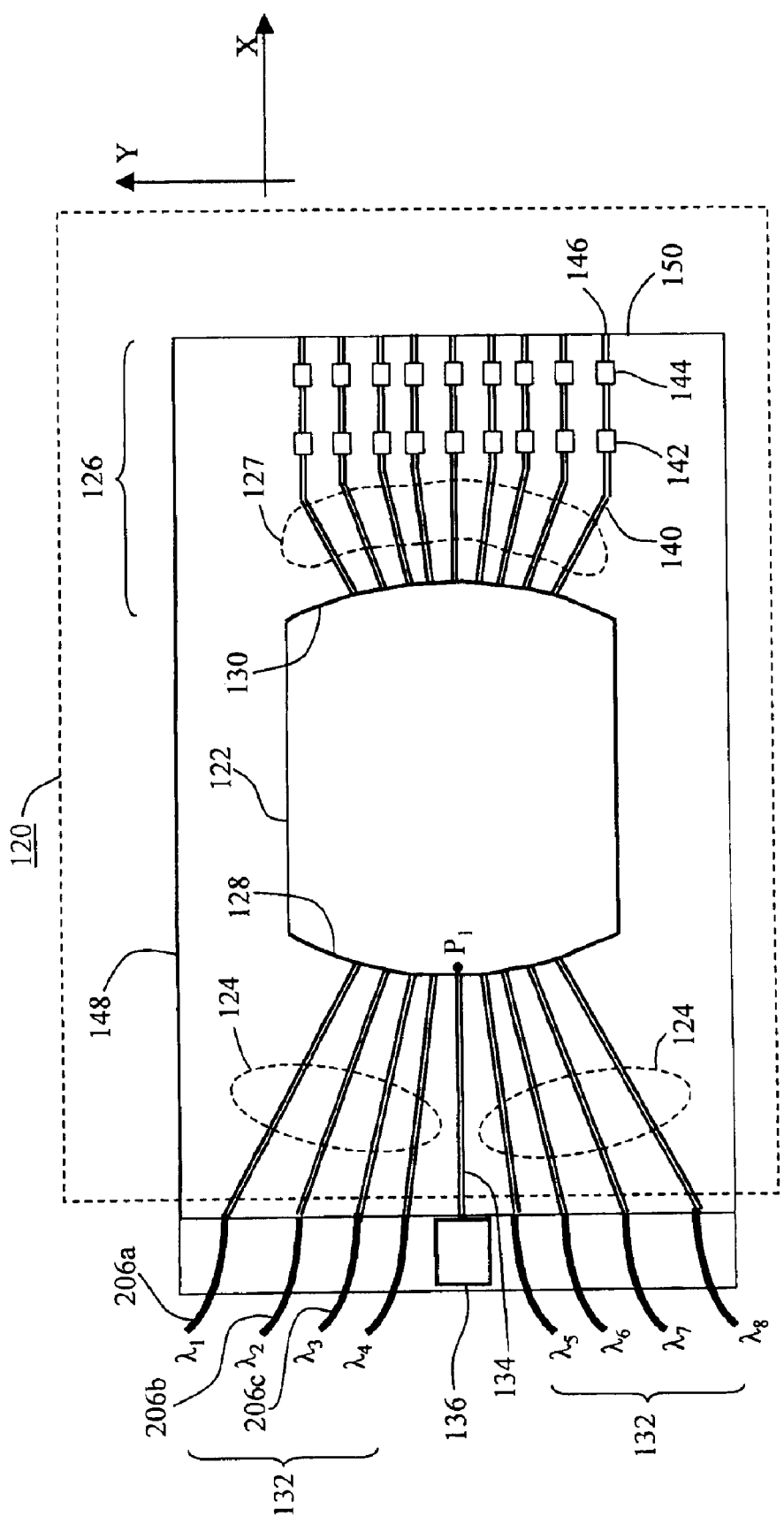
FIGS. 2 and 3 show tunable dispersion compensators.

Referring to FIG. 2, an example of a tunable dispersion compensator 120 (enclosed in dashed lines) includes a substrate 148 that supports input waveguides 124, a free propagation region 122, an adjustment region 126, and an output waveguide 134. Free propagation region 122 has a front end 128 and a rear end 130. Portions of the front end 128 are connected to input waveguides 124 and output waveguide 134, and the rear end 130 is connected to adjustment region 126. Input waveguides 124 are connected to input fibers 132 that receive lightwave signals. Output waveguide 134 is connected to a detector 136 that converts optical signals into electrical signals. Detector 136 may be integrated on the same substrate 148, and may be connected to additional circuitry (not shown) to process the electrical signals. Adjustment region 126 includes a waveguide array 127 in which the optical path length difference between adjacent waveguides are predetermined. Adjustment region 126 also includes an array of optical tunable phase shifters (or delay lines), an array of tunable optical attenuators, and an array of dielectric mirrors (or Faraday rotator mirrors).

In one example, input fibers 132 transmit lightwave signals from 8 different channels, one channel per fiber. Each channel uses a band of wavelengths around a center wavelength. The center wavelengths of the channels are $\lambda_1$=1550 nm, $\lambda_2$=1550.5 nm, . . . , and $\lambda_8$=1553.5 nm. In another example, input fibers 132 transmit lightwave signals from 16 different channels, two channels per fiber. A fiber 206a is used to transmit signals of channels 1 and 9, a fiber 206b is used to transmit signals of channels 2 and 10, a fiber 206c is used to transmit signals of channels 3 and 11, and so forth.

When designing the tunable dispersion compensator 120, the number of input waveguides depends on the free spectral range and channel spacing. The larger the free spectral range or the smaller the channel spacing, the larger the number of input waveguides that can be accommodated.

Input lightwave signals travel through input fibers and input waveguides, pass front end 128, and travel through free propagation region 122 to rear end 130. Region 122 is a dielectric slab that confines light waves in one dimension (e.g., along a direction perpendicular to the plane of FIG. 2), but allows light to freely propagate in a two-dimensional plane (e.g., along the plane of FIG. 2). As the light waves travel from front end 128 to rear end 130, the cross section of the light waves spread out (e.g., in the Y-direction).

At the rear end 130, the light waves enter adjustment region 126 that includes an array of waveguides optically coupled to tunable attenuators and tunable phase shifters. Different portions of the light waves enter different waveguides. The waveguides have different optical path lengths. After the light waves travel a certain length along the waveguides in array 127, components of the light waves having different wavelengths will interfere constructively at different waveguides. By imparting different amounts of phase shifts and attenuations to the light waves in different waveguides, different amounts of phase shifts and attenuations may be imparted to components of the light waves having different wavelengths. This allows re-shaping of the light waves in the frequency domain.

Each waveguide (e.g., 140) in array 127 is connected to a tunable attenuator (e.g., 142), which is optically connected to a thermo-optical tunable phase shifter (e.g., 144), which in turn is optically connected to a dielectric mirror (e.g., 146) connected to an edge 150 of substrate 148. In operation, the light waves that enter waveguide 140 through rear end 130 travel toward mirror 146, is reflected by mirror 146, and travel in reverse direction toward rear end 130. The light waves travel through waveguide 140 twice and pass through attenuator 142 and phase shifter 144 twice.

The attenuator and phase shifter associated with each waveguide in array 127 is independently controllable via control lines (not shown) that are connected to control module 118 (see FIG. 1), allowing independent control of the phase shift and amplitude attenuation of the portion of the light waves in each waveguide.

After traveling round-trip through the waveguides in array 127, light waves emerge at rear end 130 and propagate through free propagation region 122 toward front end 128. The light waves that emerge from each waveguide in array 127 may have a different phase and amplitude, and interfere with one another at the front end 128. By properly designing waveguide array 127 and controlling the phase shifters and attenuators in region 126 to provide proper phase shift and attenuation, the lightwave signals from one of the input waveguides 124 (after traveling round-trip through free propagation region 122 and adjustment region 126) will interfere constructively at a point $P_1$ to generate output lightwave signals that enter output waveguide 134.

Due to the phase shift and attenuation imparted to the light waves as they travel through region 126, the amplitude and phase profiles of the output lightwave signals will be different from the amplitude and phase profiles of the input lightwave signals. Tile term "amplitude profile" refers to the amplitude of the signals across a spectrum of wavelengths. The term "phase profile" refers to the phase of the signals across a spectrum of wavelengths relative to a reference point. If there is no chromatic dispersion, signals having different wavelengths that have the same phase at the transmitter end will also have the same phase at the receiver end. Due to chromatic dispersion, signals having different wavelengths that have the same phase at the transmitter end will have different phases at the receiver end, resulting in dispersion. By properly controlling the phase shifters and attenuators, the output lightwave signals of compensator 120 will have a dispersion that is different compared to the input lightwave signals so that an accurate signal may be detected by detector 136. The output lightwave signals may have reduced dispersion (for post-chip applications) or increased dispersion (for pre-chirp applications) as compared to the input lightwave signals.

Detector 136 is connected to control module 118 that dynamically adjusts the amount of phase shift and amplitude attenuation applied to the light waves traveling through adjustment region 126. Control module 118 adjusts the phase shifts to achieve an optimum Q value. The Q-factor is a figure of merit used to describe the signal-to-noise ratio of optically amplified transmission systems. The higher the Q value, the lower the bit error rate. Control module 118 measures signal degradation or errors in the signals detected by detector 136 and adjusts the amount of phase shift to reduce the signal degradation or the number of errors. Control module 118 also adjusts the attenuation to provide apodization of the signals.

In one example, control module 118 may detect signal degradation by measuring parameters of an eye diagram derived from the detected signals. Control module 118 may adjust one or more control voltages applied to the array of phase shifters (e.g., 144) to optimize signal reception based on the measurements of the eye diagram. In another example, packets transmitted over optical fiber 105 may include parity bytes. Control module 118 may be connected to an overhead processor (not shown) that extracts the parity bytes from the overhead of data packets. The parity bytes extracted by the overhead processors are matched with parity bytes computed from the data extracted from the detected signals. Control module 118 adjusts one or more control voltages applied to the array of phase shifters until the number of matches reaches a maximum value. In another example, when data transmitted through optical fiber 105 is encoded using forward error correction (FEC) coding, an FEC decoder (not shown) may be used to determine the number of errors. Control module 118 adjusts one or more control voltages applied to the array of phase shifters until the number of errors reaches a minimum value. A transmitter (e.g., 101) may also insert a reference signal into the data stream so that receiver 103 may determine the amount of dispersion by comparing the received reference signal with a pre-stored reference signal. Control module 118 adjusts one or more control voltages applied to the array of phase shifters until the received reference signal matches the pre-stored reference signal.

Figure 3:
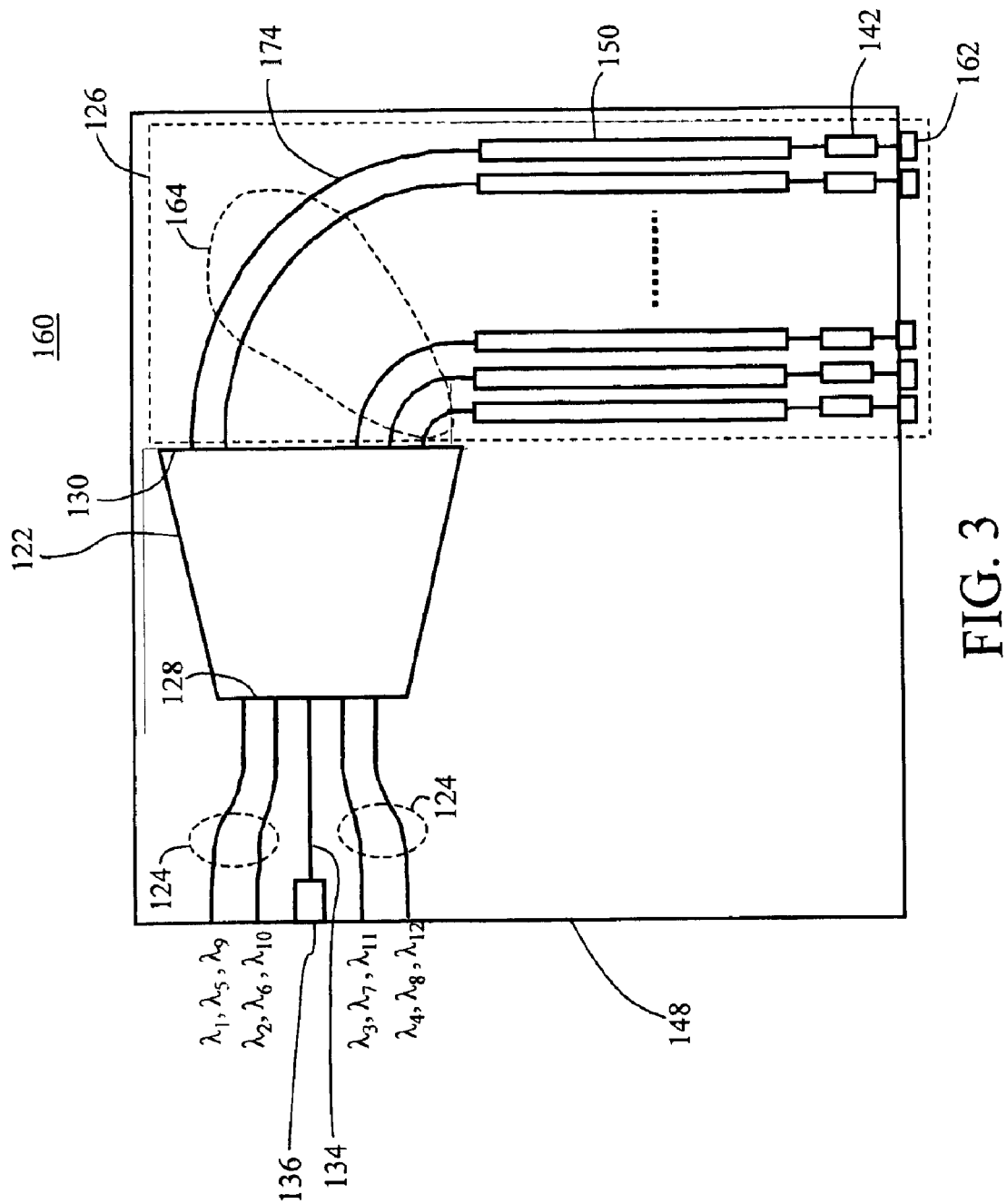

Referring to FIG. 3, an example of a tunable dispersion compensator 160 uses a waveguide array 164 having waveguides that form 90 degree arcs and having different arc lengths to increase the phase shifts in adjacent waveguides. Tunable dispersion compensator 160 includes a substrate 148 that supports input waveguides 124, a free propagation region 122, an adjustment region 126, an output waveguide 134, and a detector 136. Free propagation region 122 includes a front end 128 and a rear end 130. Adjustment region 126 includes the waveguide array 164, an array of tunable phase shifters (or delay lines), an array of tunable attenuators, and an array of mirrors. Each waveguide in array 164 (e.g., 174), is connected to a phase shifter (e.g., 150), which is optically connected to an attenuator (e.g., 142), which in turn is optically connected to a mirror (e.g., 162). The mirror may be a dielectric mirror or a Faraday rotator mirror. As light waves travel round-trip from rear end 130 to the mirrors (e.g., 162) and back, the phase shift difference due to arc length difference between adjacent delay lines will be $2n\Delta L$, where n is the refractive index of the waveguide, and $\Delta L$ is length difference between adjacent delay lines.

Using mirrors to reflect the light waves propagating in the adjustment region 126 has the advantage of reducing the lengths of the waveguides since the same amount of waveguide length difference will produce twice the amount of phase shift. This allows the tunable dispersion compensator 160 to be made more compact.

Figure 4:
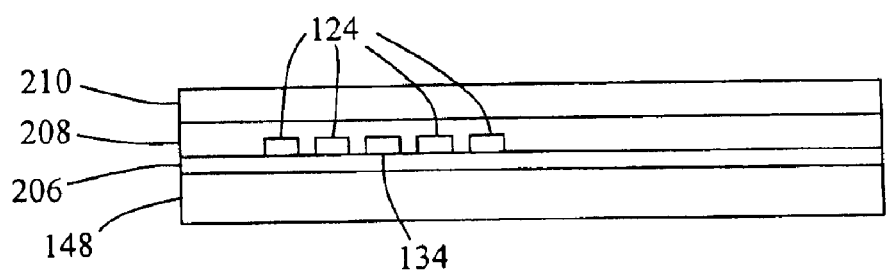
FIGS. 4–6 show cross sections of the tunable dispersion compensator of FIG. 3.
Figure 5:
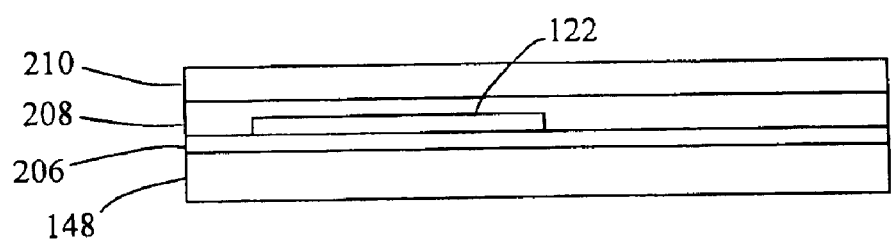
Figure 6:
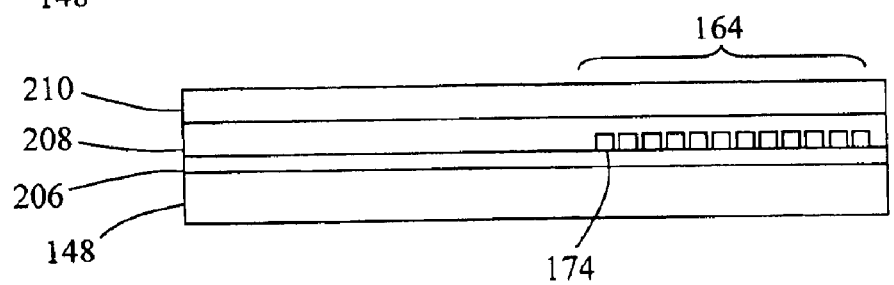

Referring to FIG. 4, aspects of fabricating the tunable dispersion compensator 160 are depicted. On top of a substrate 148 is a lower cladding layer 206. Input waveguides 124 and output waveguide 134 are disposed on top of lower cladding layer 206. An upper cladding layer 208 is disposed on top of lower cladding layer 206 and the waveguides. A protective covering layer 210 is disposed on top of upper cladding layer 208. Referring to FIG. 5, the free propagation region 122 is disposed between lower cladding layer 206 and upper cladding layer 208. FIG. 6 shows waveguides (e.g., 174) of the waveguide array 164 disposed between lower cladding layer 206 and upper cladding layer 208. The waveguides of the waveguide array 164 can be made of the same material as the waveguides 124 and 134.

Depending on application, different materials may be used for substrate 148, lower cladding layer 206, waveguides 124 and 134, waveguide array 164, free propagation region 122, upper cladding layer 208, and covering layer 210. For example, the substrate may be made of silicon. For example, the waveguides may be made of silica, indium phosphide, lithium niobate, polymer, silicon oxynitride, or sol-gel derived organic-inorganic hybrid materials. For example, the lower cladding layer may be made of silicon or silica.

The combination of arrayed waveguides, phase shifters, and optical attenuators provide a complex apodization scheme that allows control of both the phase and amplitude of the lightwave signals in the adjustment region 126. By varying the phase shift profile applied to the light waves, it is possible to select signals from different channels at the input waveguides and to compensate for the dispersion in the signals of the selected channel(s).

As an illustration, tunable dispersion compensator 160 of FIG. 3 can be used to receive signals from 12 different channels, with each input fiber 124 receiving signals from 3 different channels. An input fiber may transmit signals from channels 1, 5, and 9 using center wavelengths $\lambda_1$=1550 nm, $\lambda_5$=1552 nm, and $\lambda_9$=1554 nm, respectively. Another input fiber may transmit signals from channels 2, 6, and 10 using center wavelengths $\lambda_2$=1550.5 nm, $\lambda_6$=1552.5 nm, and $\lambda_{10}$=1554.5 nm, respectively, and so forth.

Figure 7:
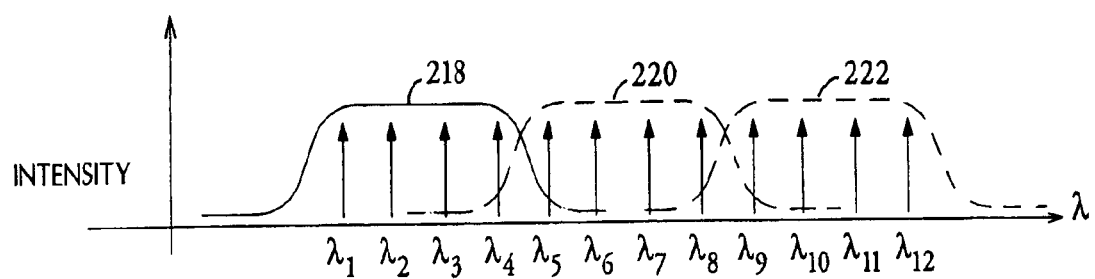
FIGS. 7–12 are graphs.
Figure 8:
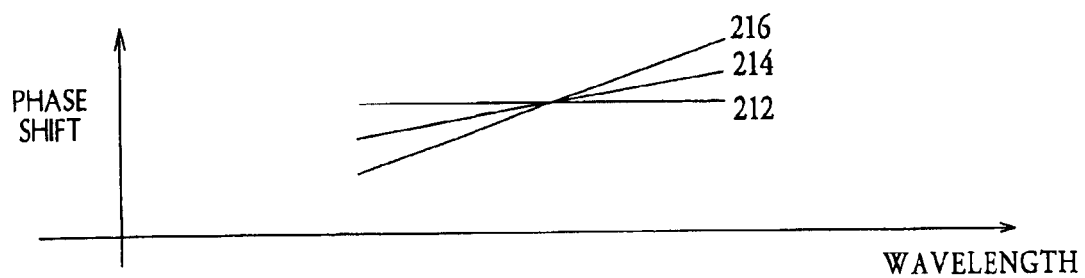

Referring to FIGS. 7 and 8, when the phase shifters and attenuators of adjustment region 126 are controlled so that a constant phase shift profile 212 is applied to the light waves (i.e., there is no phase shift difference among signals with different wavelengths), tunable dispersion compensator 160 will have a pass band 218 that allows light waves having center wavelengths $\lambda_1$, $\lambda_2$, $\lambda_3$, and $\lambda_4$ to pass through. Thus, the signals of channels 1, 2, 3, and 4 will appear at the output waveguide 134.

When the phase shifters of region 126 are controlled so that a linear phase shift profile is applied to the light waves (i.e., the amount of phase shift applied to the light waves varies with wavelength in a linear manner), the signals of higher channels will appear at the output waveguide 134. For example, when a linear phase shift profile 214 is applied, tunable dispersion compensator 160 will have a pass band 220 that allows light waves having center wavelengths $\lambda_5$, $\lambda_6$, $\lambda_7$, and $\lambda_8$ to pass through and appear at the output waveguide 134. When a linear phase shift profile 216 is applied, tunable dispersion compensator 160 will have a pass band 222 that allows light waves with center wavelengths $\lambda_9$, $\lambda_{10}$, $\lambda_{11}$, and $\lambda_{12}$ to pass through and appear at output waveguide 134.

In one example, the input waveguides 124 are coupled to a switch (not shown) that selects signals from channels that enter a single waveguide. For example, the switch may select signals from channels 1, 5, and 9, and block all other signals. Depending on the amount of phase shift applied by the phase shifters in region 126, the signals from one of channels 1, 5, and 9 will appear at output waveguide 134. Similarly, the switch may select signals from channels 2, 6, and 10, and block all other signals. Depending on the amount of phase shift applied by the phase shifters in region 126, the signals from one of channels 2, 6, and 10 will appear at output waveguide 134, and so forth. In another example, the signals of each channel occupy a frequency band that is different from the signals of other channels. The signals detected by detector 136 will include signals from channels 1, 2, 3, and 4, which can be further separated using band pass filters.

Figure 9:
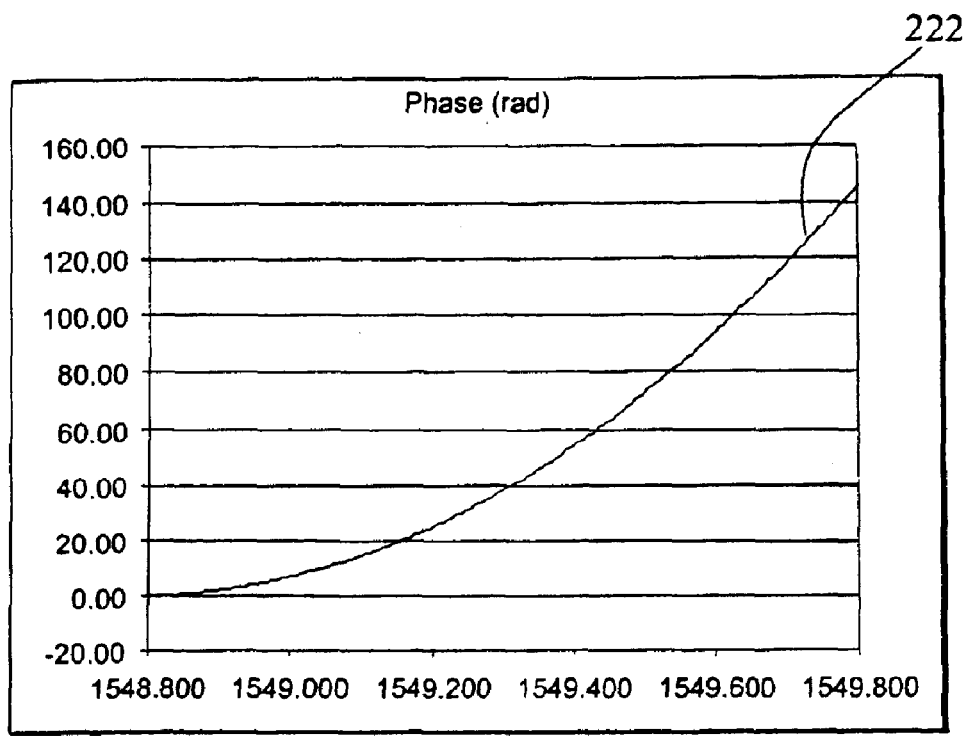
Figure 10:
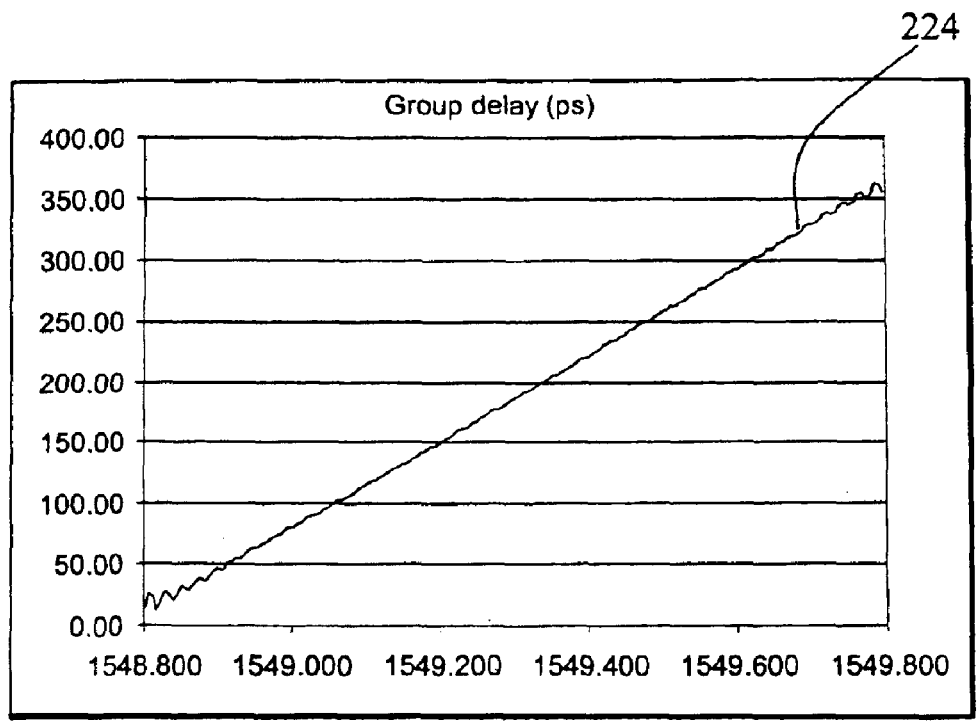
Figure 11:
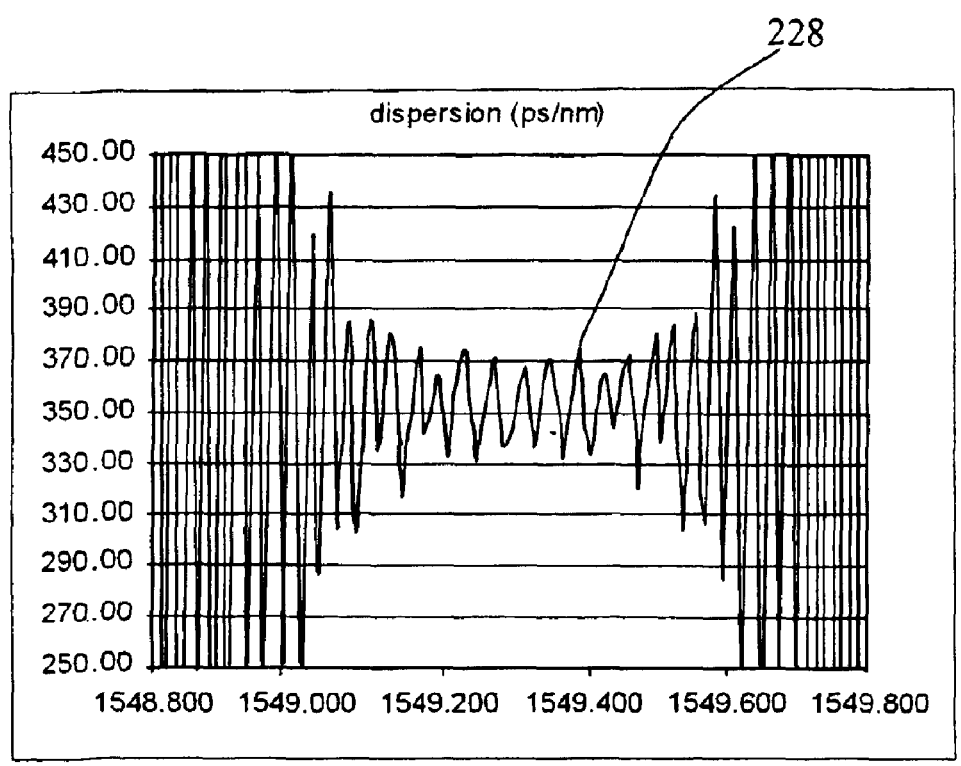

Referring to FIGS. 9–11, when the phase shifters of region 126 are controlled so that a near second order (quadratic) phase shift profile 222 is applied to the light waves passing through adjustment region 126, a near first order (linear) group delay profile 224 is induced in the light waves to produce a zero order (flat) dispersion profile 228. The ripples in dispersion profile 228 can be reduced by applying proper amounts of attenuation as described later. When a third order (cubic) phase shift profile is applied to the light waves passing through adjustment region 126, a second order group delay profile is induced in the light waves to produce a first order dispersion profile. The dispersion induced by the phase shifters in region 126 may be used to compensate the dispersion imparted to the lightwave signals as they travel through the transmission medium (e.g., optical fiber 105).

Figure 12:
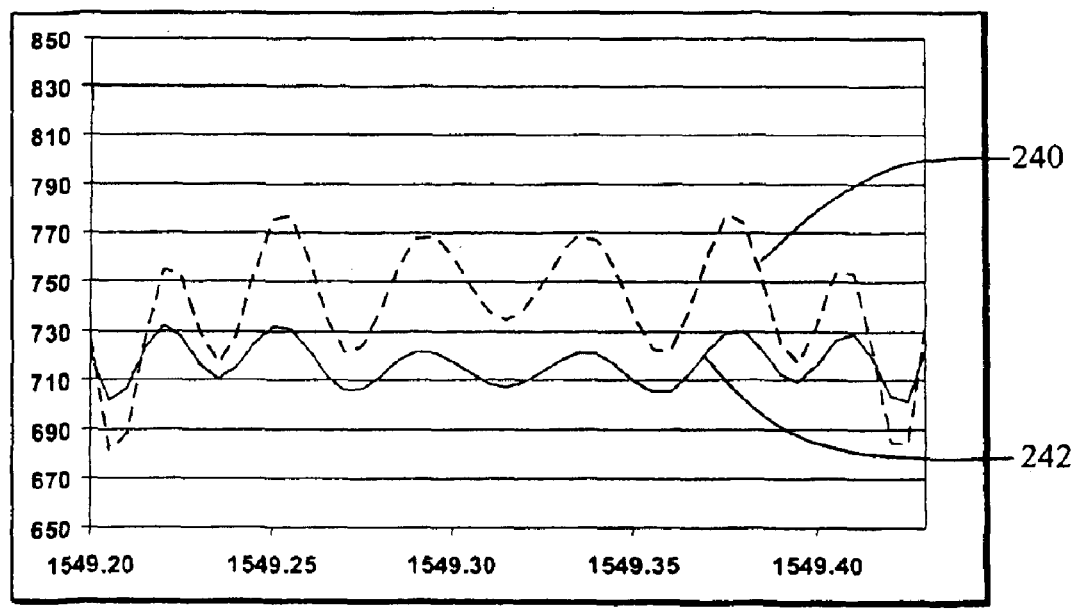

By controlling the attenuators (e.g., 142) to apply a proper amount of attenuation to the light waves in adjustment region 126, the ripples in the dispersion profile 228 may be reduced. This is commonly referred to as "apodization." Various attenuation profiles may be used, such as a Gaussian curve or a Hamming window. Referring to FIG. 12, a dispersion profile 240 (shown in dashed lines) is obtained by applying a second order phase shift profile to the light waves passing through adjustment region 126 without applying attenuation. An apodized dispersion profile 242 (shown in solid lines) is obtained by applying a second order phase shift profile and a proper amount of attenuation to the light waves passing through adjustment region 126. A Gaussian attenuation profile was used in this example. As can be seen in the figure, the apodized dispersion profile 242 has a peak-to-peak ripple of about 25 ps/nm, whereas the dispersion profile 240 (without attenuation) has a peak-to-peak ripple of about 90 ps/nm. A flatter dispersion profile with less ripple results in less signal distortion.

By adjusting the amount of attenuation applied to each waveguide in the adjustment region, the transmission profile of the lightwave signals can be modified. As an example, the tunable dispersion compensators described above may function as gain flattening filters that compensate the uneven gain spectrums of optical amplifiers, such as erbium-doped fiber amplifiers. The attenuators are controlled by control module 118 to have an attenuation profile that is the complementary of the gain profile of the optical amplifiers. The attenuation is higher in the portion of the spectrum where the gain is higher, the attenuation is lower in the portion of the spectrum where the gain is lower. This produces a flattened gain spectrum with the gain equal to the lowest gain without attenuation. Thus, properly adjusted, a tunable dispersion compensator not only compensates chromatic dispersion, but also compensates uneven gain spectrum to produce a flattened gain profile.

Optical attenuators and phase shifters can be implemented using materials that have thermo-optical, electro-optical, or magneto-optical effects. The change in refractive indices of the materials may vary in a linear or nonlinear relation with respect to a control signal applied to induce the thermo-, electron-, or magneto-optical effects. In FIG. 3, a linear phase shift profile is achieved by waveguide array 164 designed so that the length differences between adjacent waveguides are the same for each pair of waveguides. Each phase shifter (e.g., 150) may be controlled by an independent control signal. The control signal may be a control voltage or a control current. Adjusting the control signals causes the phase shifters to increase or decrease the phase shift differences applied to light waves traveling in adjacent waveguides. This allows an arbitrary phase shift profile (e.g., first order, second order, third order, etc.) to be applied to light waves traveling through adjustment region 126.

In applications where a predetermined amount of phase shift is required, it is possible to design the lengths of the waveguides in array 164 so that after the light waves travel round-trip through the waveguides in array 164, the desired phase shift is achieved. Depending on application, the length of the waveguides may have a first order, second order, or another higher order profile. In these applications, it is not necessary to use additional phase shifters (e.g., 150).

In applications where a predetermined phase shift profile (e.g., first order, second order, or third order ,etc.) is required but the amount of phase shift may vary, it is possible to design the waveguides and phase shifters so that a single control signal is used to control the phase shifters. Adjustment of the control signal changes the amount of phase shift, but does not change the profile of the overall phase shift. For example, the lengths of waveguides in array 164 may have a second order profile. The phase shifters may be implemented using materials that have thermo-optical effects and have lengths with a second order profile. Varying the control signal applied to all of the phase shifters will change the phase shift, but the phase shift profile will remain second order.

In applications where the phase shift needs to change between two profiles, such as between a linear profile and a second order profile, two approaches may be used. The first approach is to design the lengths of waveguides in array 164 to have a first order profile so that when the control signal is zero, the overall phase shift has a linear profile. The phase shifters are designed to increase the differences of phase shifts applied to light waves traveling between adjacent waveguides so that when a control signal of a preset value is applied to the phase shifters, the overall phase shift obtains a second order profile.

The second approach is to design the lengths of waveguides in array 164 to have a second order profile so that when the control signal is zero, the overall phase shift has a second order profile. The phase shifters are designed to decrease the differences of phase shifts applied to light waves traveling in adjacent waveguides so that when a control signal of a preset value is applied to the phase shifters, the overall phase shift obtains a first order profile.

The attenuators (e.g., 142) may be controlled by independent control signals so that an arbitrary attenuation profile can be applied to the light waves traveling in adjustment region 126. The control signals may be a control voltage or a control current.

In applications where a fixed amount of attenuation is required, the attenuators may be fixed, and no control voltage is required. Fixed attenuation may also be achieved by using mirrors with less than 100% reflectivity. In FIG. 3, by using mirrors (e.g., 162) with different reflectivity values, a fixed attenuation profile may be achieved. Attenuation may also be achieved by inducing intrinsic loss in the waveguides.

In applications where a fixed attenuation profile is required, but the amount of attenuation may vary, the attenuators may be controlled by a single control signal. By varying the control signal, the amount of attenuation may be adjusted while maintaining the predefined attenuation profile.

The following describes a spectral transmission function of the tunable dispersion compensator 120 or 160. In general, when one or more voltage control signals are used to control the phase shifters and attenuators, the spectral transmission function can be described as:

$$T(\lambda) = \sum_{k=1}^{K} \exp\left(-\alpha\left(k - \frac{K}{2}\right)^2 + \beta(V)\left(\sin\left(\frac{\pi k}{K}\right)\right)^r + j\frac{2\pi n \Delta l}{\lambda}\left(A_1(V)k + A_2(V)\left|k - \frac{K}{2}\right|^x + A_3(V)\left|k - \frac{K}{2}\right|^y + A_4(V)\left|k - \frac{K}{2}\right|^z\right)\right)$$ (Equ. 1)

where "K" is an integer selected to represent the number of waveguides that are used in the adjustment region, and "n" is the effective refractive index of waveguides in the adjustment region. The symbol "V" represents that $\beta$ and $A_1$–$A_4$ are controlled by voltage signals. Alternatively, electric current signals may be used to control the phase shifters and attenuators, thereby controlling $\beta$ and $A_1$–$A_4$. In one example, one control signal is used to control $\beta$, and another control signal is used to control $A_1$–$A_4$. In another example, more than one control signal are used to control the phase shifters, and the adjustment region is designed so that the values of $A_1$ to $A_4$ are individually controlled by separate control signals. The relationship between the voltage control signal (or current control signal) and the amount of phase shift induced can be either linear or nonlinear, depending on the physical effect being used to induce the phase shift.

The values of $\beta(V)$, $A_1(V)$, $A_2(V)$, $A_3(V)$, and $A_4(V)$ depend directly or indirectly on the control signal "V," which is controlled by the control module 118. The exact formulas for $\beta(V)$, $A_1(V)$, $A_2(V)$, $A_3(V)$, and $A_4(V)$ depend on the particular design of the tunable dispersion waveguide. If more than one control signal is used to control the phase shifters and attenuators, the $A_1$, $A_2$, $A_3$, and $A_4$ will depend on the control signals that control the phase shifters, and $\beta$ will depend on the control signals that control the attenuators.

In general, $\beta(V)$ introduces apodized chirp grating, $A_1(V)$ adjusts the center wavelength, $A_2(V)$ adjusts near $2^{nd}$ order phase coefficient, $A_3(V)$ adjusts near $4^{th}$ order phase coefficient, and $A_4(V)$ adjusts near $6^{th}$ order phase coefficient. In one example, $r \approx 1$, $x \approx 2$, $y \approx 4$, and $z \approx 6$. This produces the phase shift, group delay, and dispersion profiles shown in FIGS. 9–11.

Figure 13:
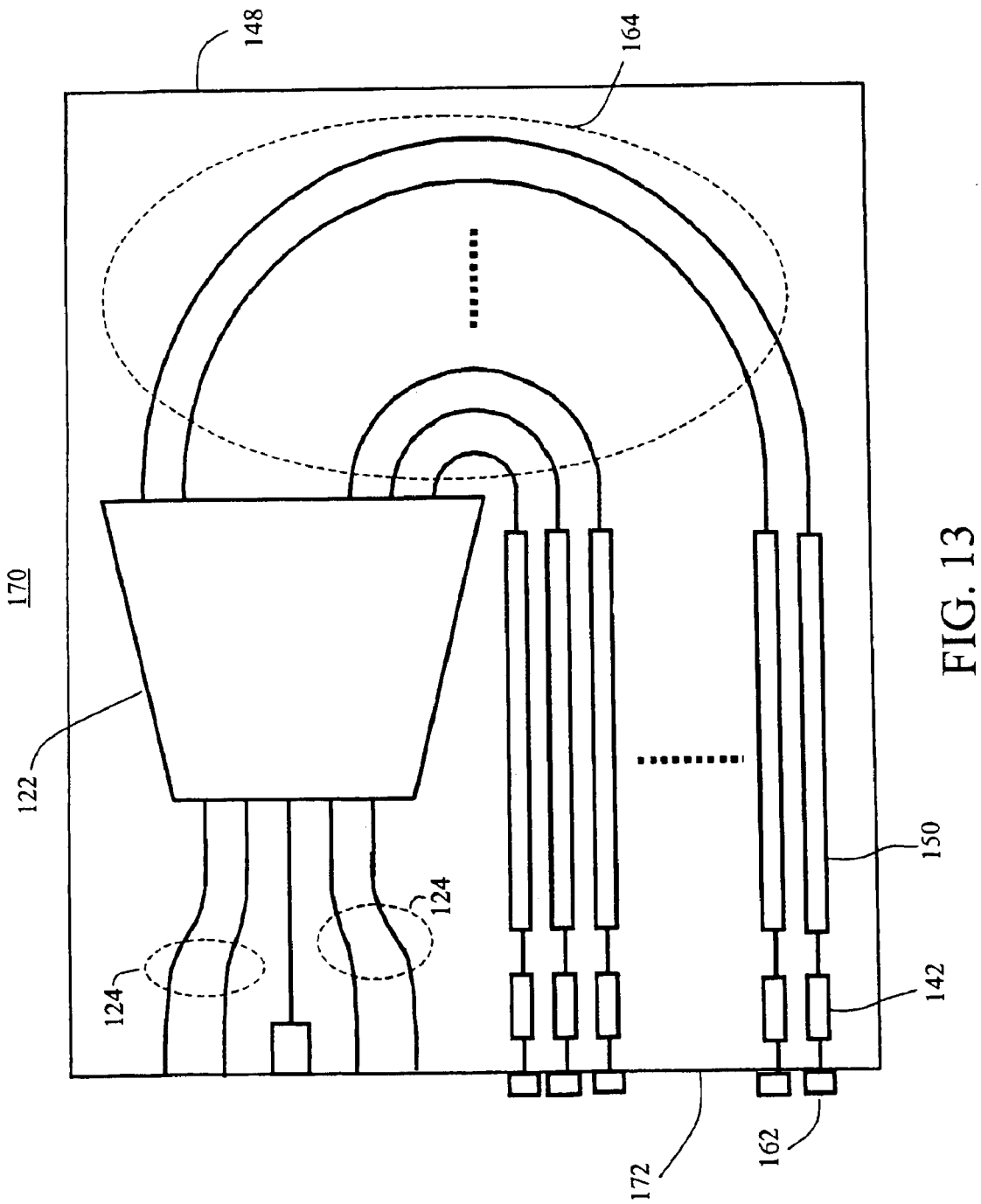
FIGS. 13–21 show tunable dispersion compensators.

Referring to FIG. 13, an example of a tunable dispersion compensator 170 has a configuration similar to compensator 160 except that the waveguide array 164 includes waveguides that form 180 degree arcs. One advantage of compensator 170 is that light waves traveling in adjacent waveguides will have a larger phase shift difference since the path length difference will be greater as compared to the waveguides in compensator 160. Another advantage of compensator 170 is that input waveguides 124 and the mirrors (e.g., 162) contact a same edge 172 of substrate 148. Thus, only one edge of the substrate needs to be polished to ensure low loss of the light wave signals that pass through the edge.

Figure 14:
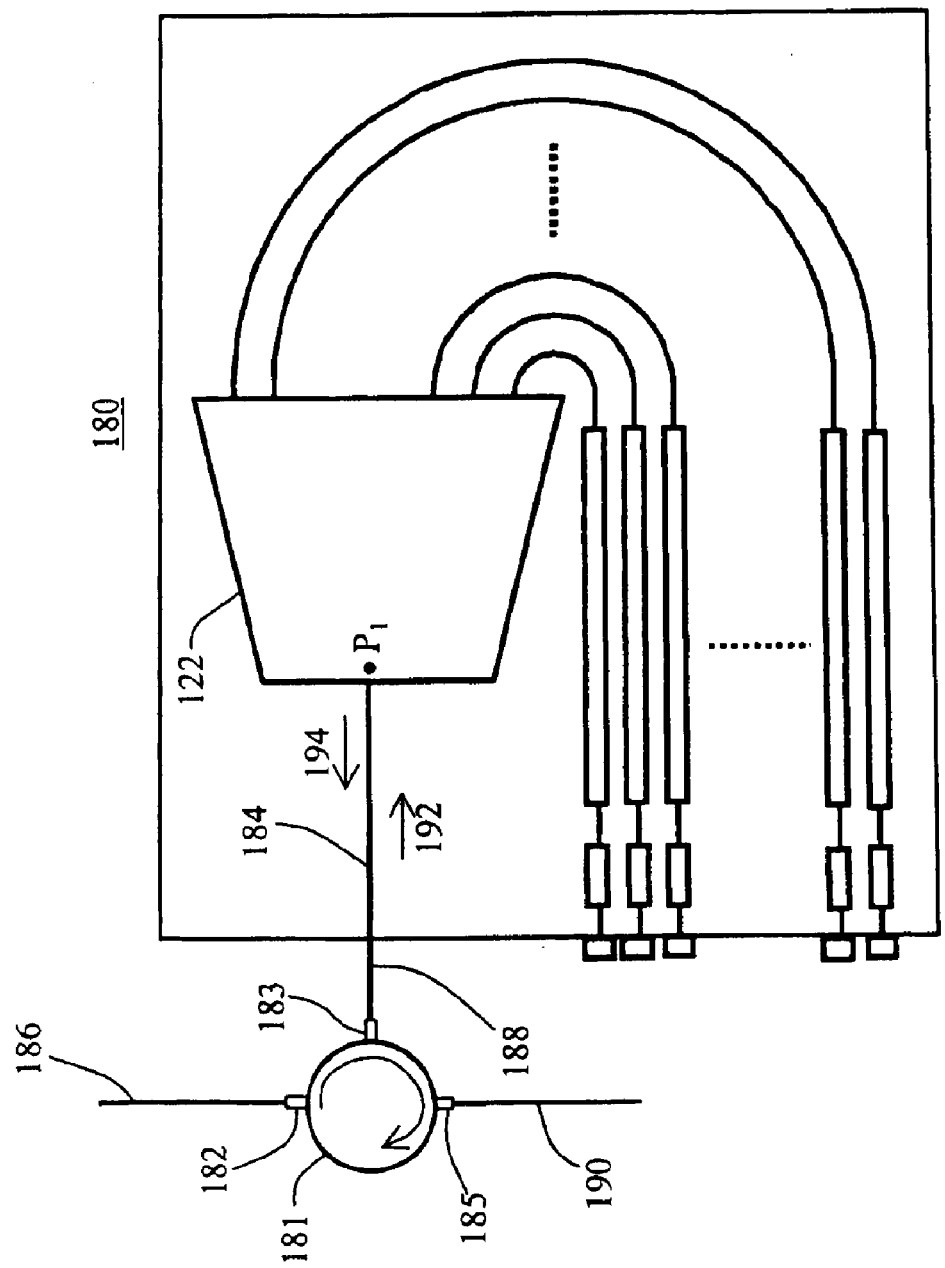

FIG. 14 shows an example of a tunable dispersion compensator 180 that is similar to compensator 170 except that a single waveguide 184 is used to couple input and output lightwave signals into/out of free propagation region 122. An optical circulator 181 is used to separate the input lightwave signals from the output lightwave signals, allowing waveguide 184 to function as the input and output waveguide for tunable dispersion compensator 180. Optical circulator 181 is configured to direct signals entering a first port 182 to a second port 183, and to direct signals entering the second port 183 to a third port 185. The first port 182 is coupled to an input fiber 186, the second port 183 is coupled to a connecting fiber 188 (which is coupled to waveguide 184), and the third port 185 is coupled to an output fiber 190.

Input lightwave signals travel through fiber 186, enter port 182, pass through optical circulator 181, exit port 183, and travel through fiber 188 and waveguide 184 in a forward direction 192. The control module 118 controls the phase shifters (and perhaps the attenuators as well) in the adjustment region so that the light waves traveling round-trip through free propagation region 122 and the adjustment region will interfere constructively at a point $P_1$ to form the output lightwave signal. The output lightwave signals enter waveguide 184 and travel in a reverse direction 194 from waveguide 184 to fiber 188, enter port 183, pass through optical circulator 181, exit port 185, and travel onward in output fiber 190.

Using optical circulator 181 has the advantage that only one waveguide (e.g., 184) is required to interface free propagation region 122. This may reduce the overall cost of constructing compensator 180 because it reduces the need to make multiple low-loss interfaces between input waveguides and the free propagation region.

Figure 15:
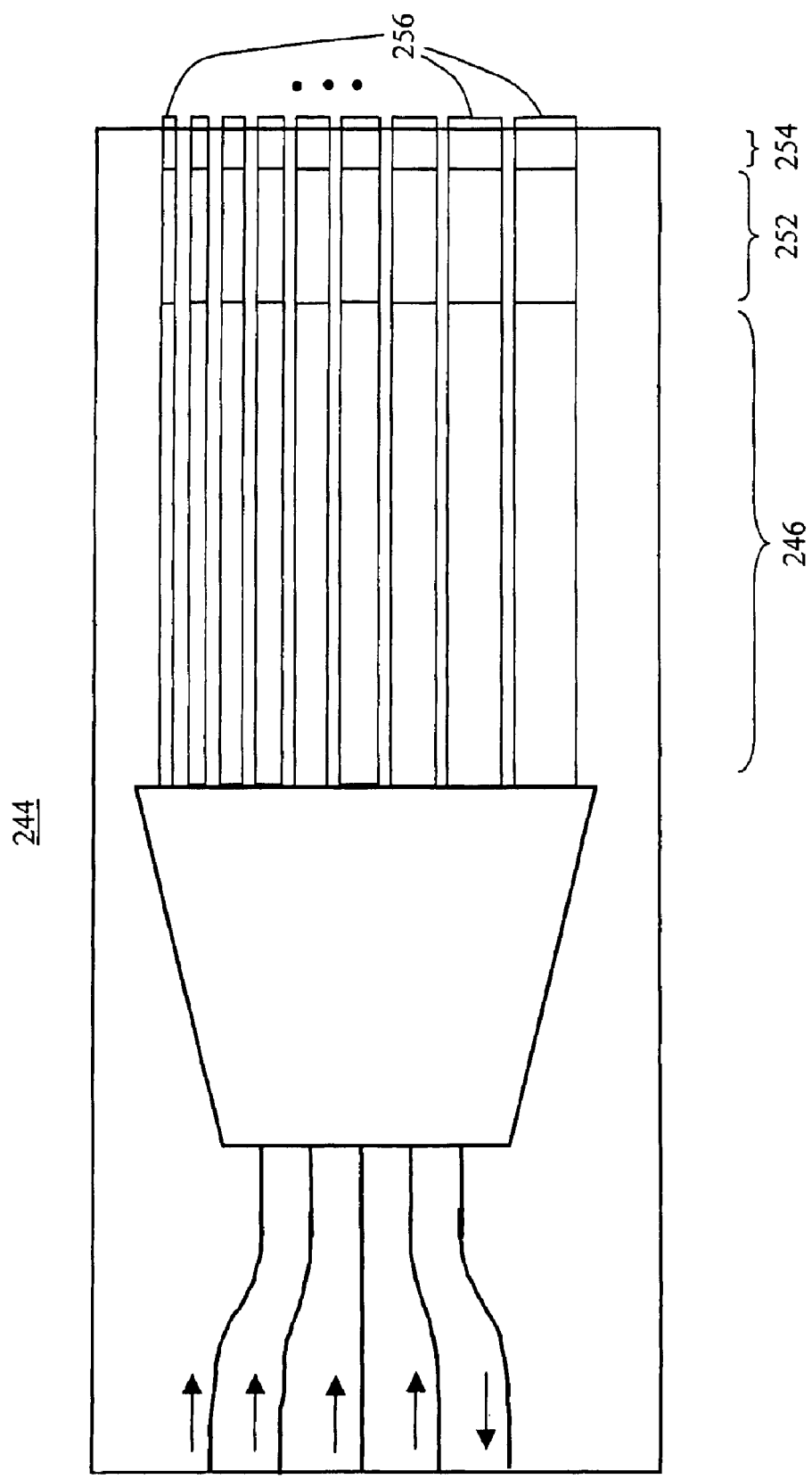

Referring to FIG. 15, an example of a tunable dispersion compensator 244 includes an array of waveguides 246 having the same length but different widths. The widths of the waveguides 246 are designed so that the effective refractive indices of the waveguides have a desired profile, e.g., first order, second order, or a higher order, etc. As light waves pass through the array of waveguides, a desired phase shift profile is imparted to the light waves. The tunable dispersion compensator 244 includes adjustable phase shifters 252, adjustable attenuators 254, and mirrors 256, similar to those in FIGS. 3 and 13.

In another example of a tunable dispersion compensator, the array of waveguides may have the same dimensions but doped with different amounts of impurities to change the effective refractive indices. By adding selected amounts of dopants to the waveguides, a desired effective refractive profile may be achieved. In another example, a combination of the methods described above may be used, where the length, width, and height of the waveguides, as well as the amount of impurities added to the waveguides, are adjusted to achieve a desired effective refractive index profile across the waveguides.

Figure 16:
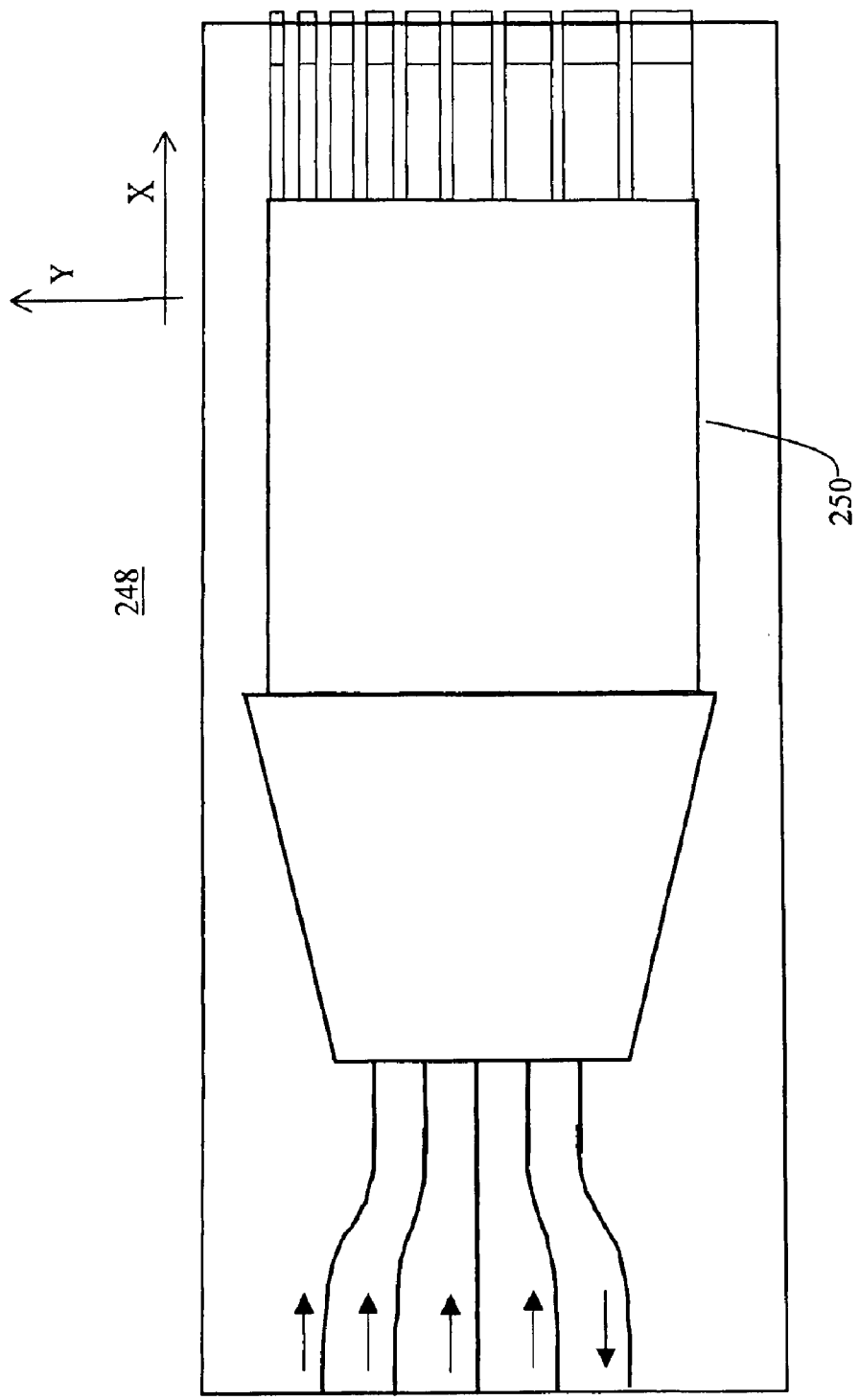

Referring to FIG. 16, an example of a tunable dispersion compensator 248 substitutes a slab waveguide 250 for the array of waveguides 246 in FIG. 15. The slab waveguide 250 is doped with impurities so that the effective refractive index changes continuously in a direction (Y-direction) transverse to the propagation direction (X-direction) of the light waves. The amount of dopant is carefully selected to achieve a desired effective refractive index profile (first order, second order, third order, etc.) across the slab waveguide in the Y-direction.

Figure 17:
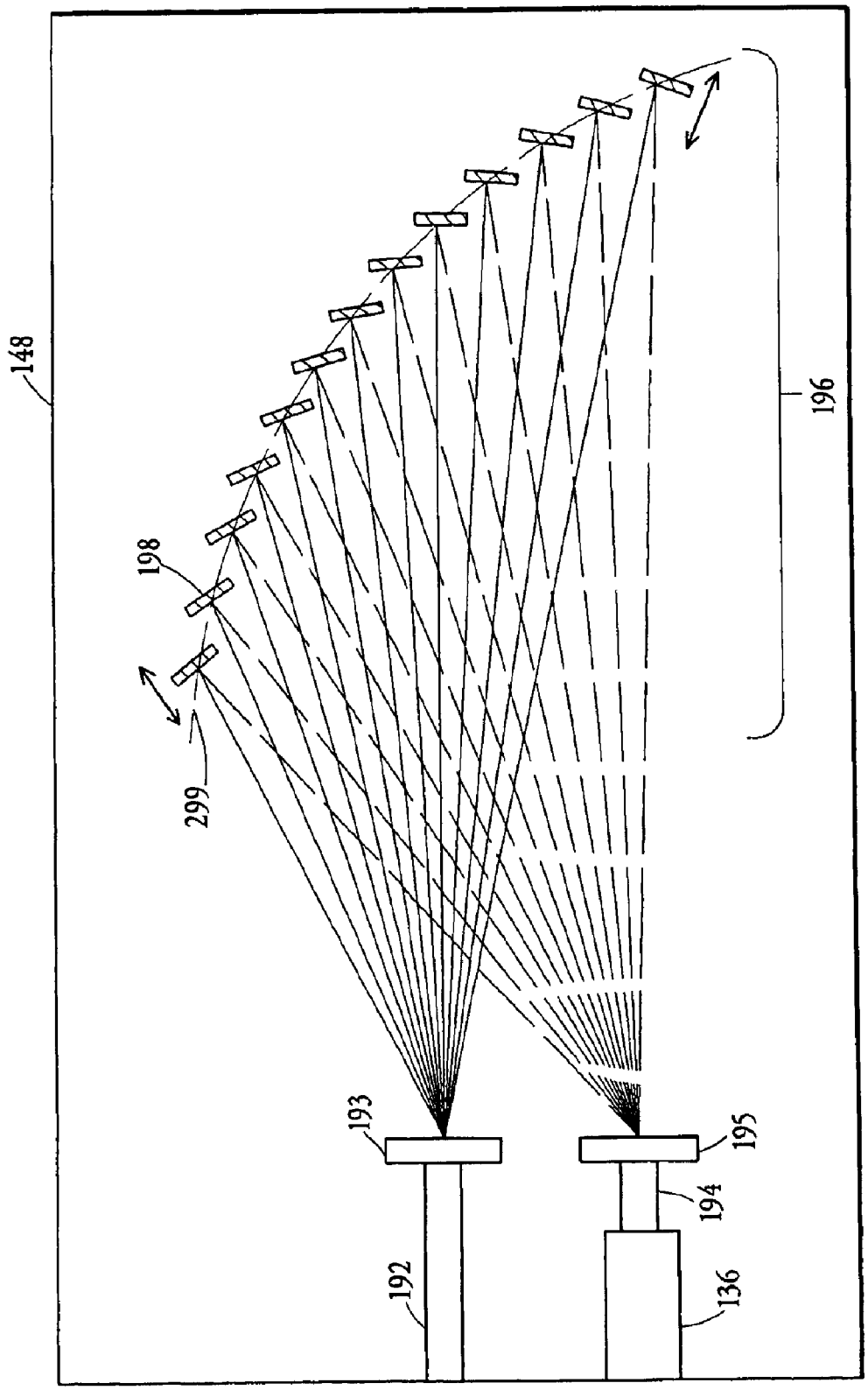

Referring to FIG. 17, an example of a tunable dispersion compensator 190 includes a substrate 148 that supports an input waveguide 192, an output waveguide 194, an integrated detector 136, and a mirror assembly 196. Light waves emanating from input waveguide 192 pass through a lens 193 so that the light waves are collimated along a direction perpendicular to the surface of substrate 148. The light waves propagate through free space towards mirror assembly 196, are reflected by the mirrors of mirror assembly 196, then travel through free space towards output waveguide 194. A lens 195 is used to focus the light waves entering output waveguide 194. An integrated detector 136 detects the lightwave signals in output waveguide 194.

Mirror assembly 196 includes mirrors (e.g., 198) that are oriented so as to face waveguides 192 and 194 such that light waves emanating from waveguide 192 will be reflected towards waveguide 194. The mirrors of mirror assembly 196 are positioned along an arc 200 such that the path lengths for the light waves traveling from input waveguide 192 to the mirrors and to output waveguide 194 are different for each mirror.

Figure 18:
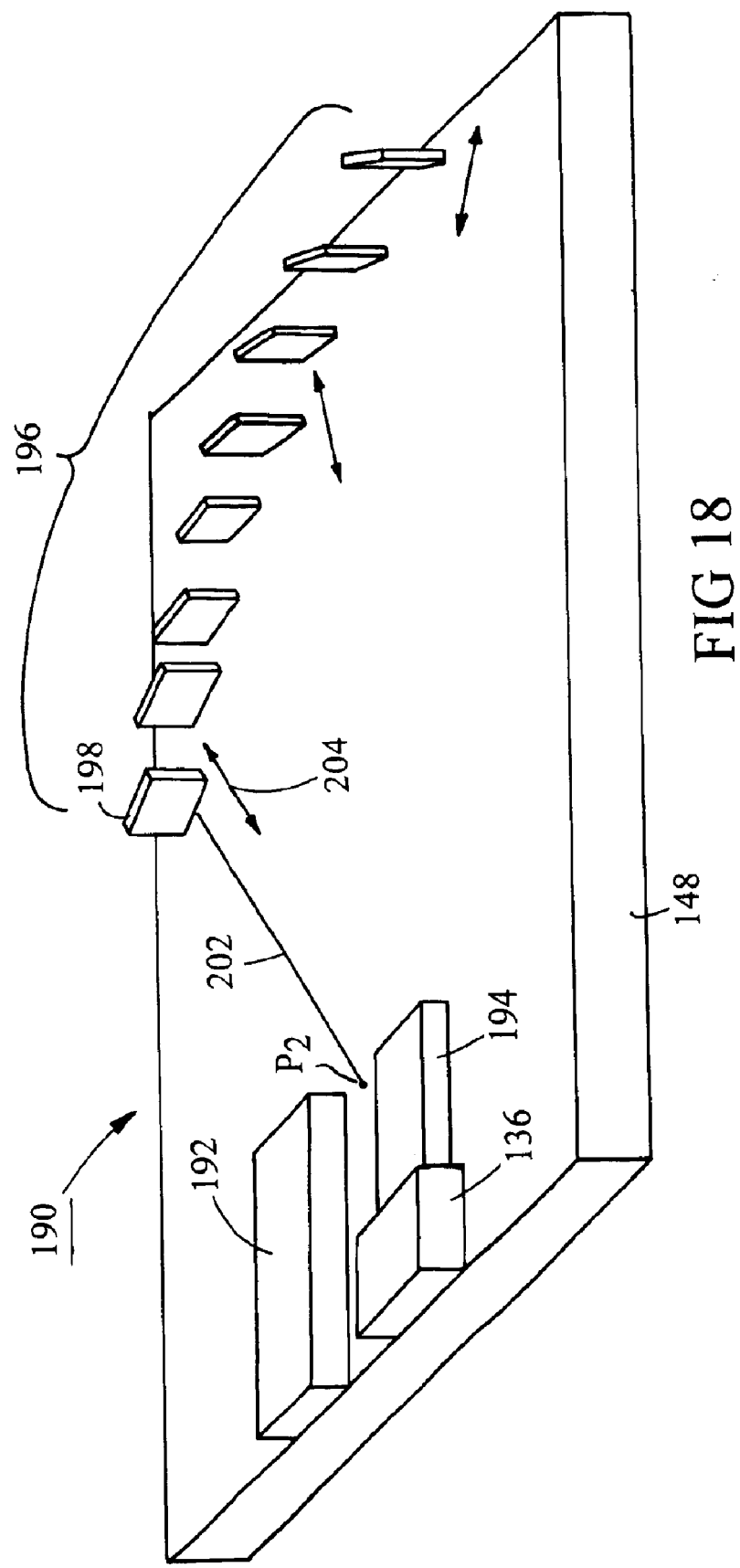

FIG. 18 shows a perspective view of the tunable dispersion compensator 190. The mirrors (e.g., 198) are microelectromechanical systems mirrors, commonly referred to as MEMS mirrors. Each mirror is translatable along a direction (e.g., 204) substantially parallel to a line (e.g., 202) connecting a center of the mirror to a point $P_2$ midway between ends of waveguides 192 and 194 so that as the mirror moves, light emanated from waveguide 192 will continue to be reflected towards waveguide 194. As the mirror moves, the optical path length from input waveguide 192 to the mirror and from the mirror to the output waveguide 194 will change. A conventional mechanism for moving the mirrors is not shown in the figure for clarity of illustration.

By properly controlling the positions of the mirrors, proper phase shifts can be applied to different portions of the input light waves so as to impart a proper amount of dispersion compensation to the input lightwave signals to generate a dispersion compensated output lightwave signal.

Figure 19:
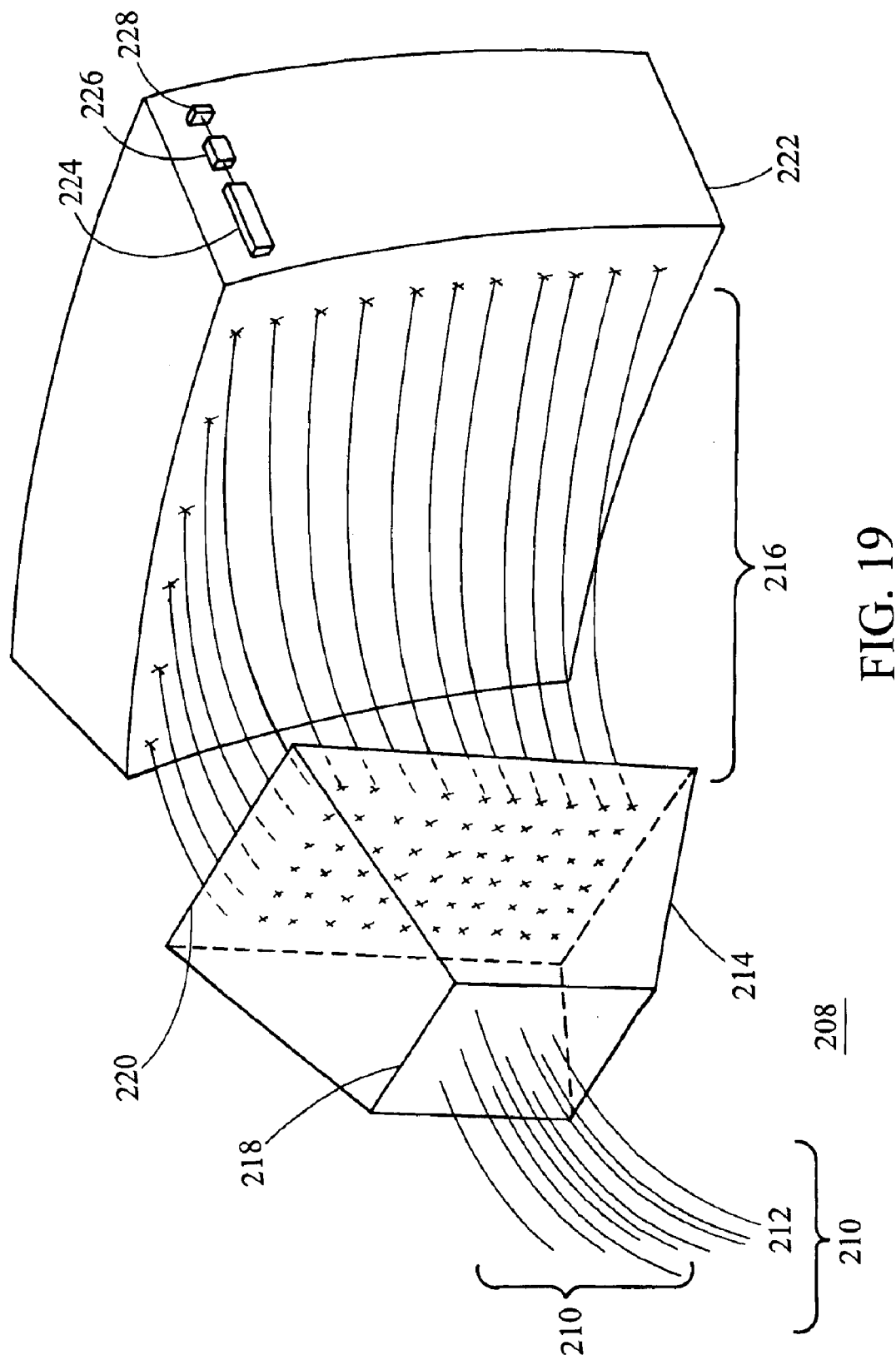

The examples of tunable dispersion compensators described above use propagation of light wave signals in a two dimensional plane. It may also be possible to utilize propagation of light wave signals in a three dimensional space. Referring to FIG. 19, a tunable dispersion compensator 208 includes input fibers 210, a free propagation region 214, an array 216 of optical fibers, and a control unit 222. Input fibers 210 transmit input lightwave signals to free propagation region 214. The lightwave signals travel through the free propagation region 214 from a front end 218 to a rear end 220. At the rear end 220, the light waves enter an array 216 of fibers having different lengths. The fibers of array 216 are connected to control unit 222 that houses an array of tunable phase shifters (e.g., 224), an array of attenuators (e.g., 226), and an array of mirrors (e.g., 228).

Lightwave signals reflected by the array of mirrors travel through fibers of array 216 towards rear end 220, then travel through free propagation region 214 towards front end 218. The light waves interfere so that an output lightwave signal is generated at output fiber 212. By properly controlling the array of phase shifters and attenuators, lightwave signals from one or more channels can be selected to appear at the output fiber 212 with the proper amount of dispersion compensation.

Figure 20:
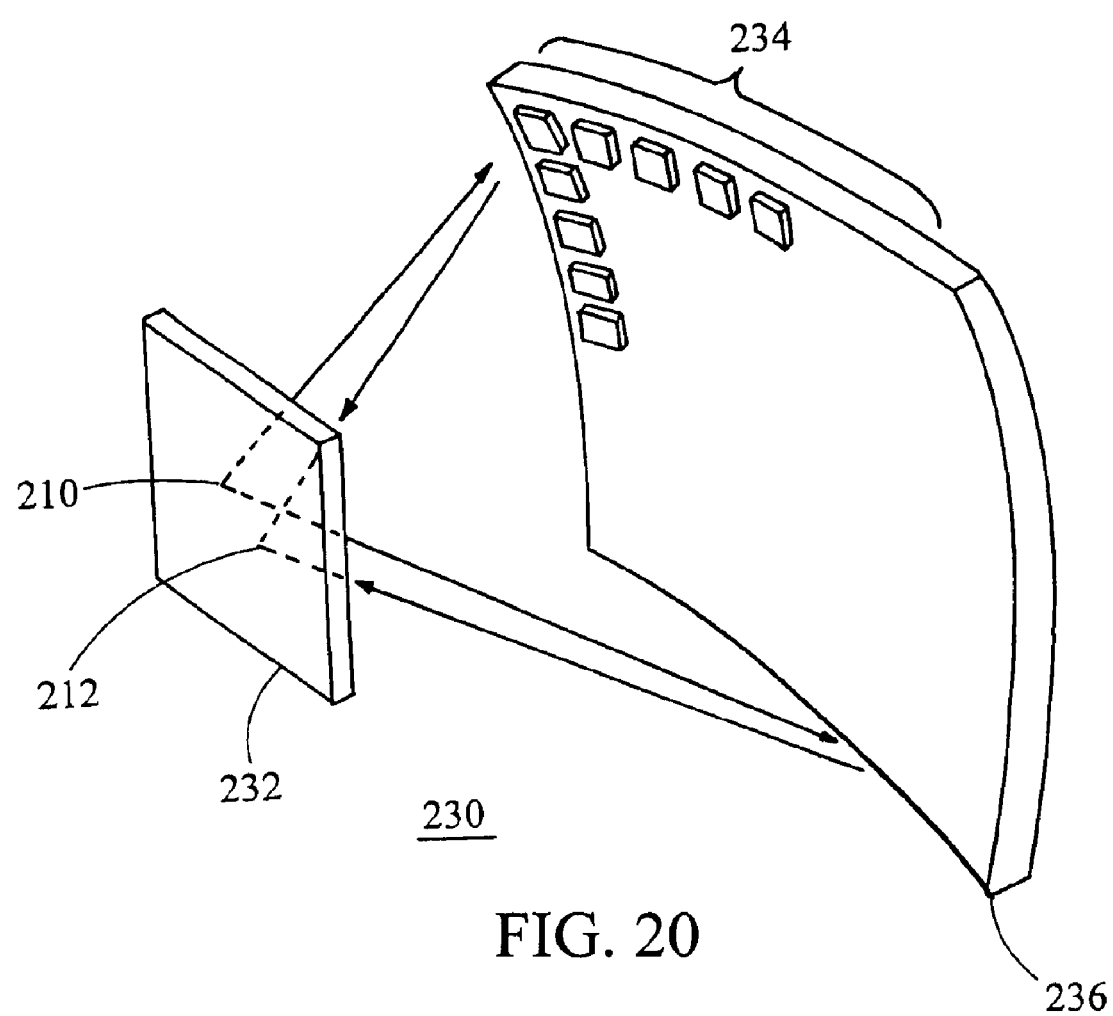

Referring to FIG. 20, a tunable dispersion compensator 230 includes an input fiber 210 that is connected to a mount 232. Input lightwave signals from the input fiber emanate from the end of the fiber and propagate through free space towards a mirror assembly 234 disposed on a support 236. The mirrors are oriented so that light waves emanating from input fiber 210 will be reflected towards an output fiber 212. Lens may be used to collimate the light waves that exit or enter the fibers. Support 236 has a curvature such that the distances from the input fiber to the mirrors are different for each mirror. Each mirror is translatable along a direction substantially parallel to a line connecting the center of the mirror to a point midway between the ends of the input and output fibers. As the mirror moves, the optical path length from the input fiber to the mirror and to the output fiber changes. By properly controlling the mirrors, proper phase shifts can be applied to different portions of the input lightwave signal so that a proper amount of dispersion compensation is applied to the input lightwave signal.

Figure 21:
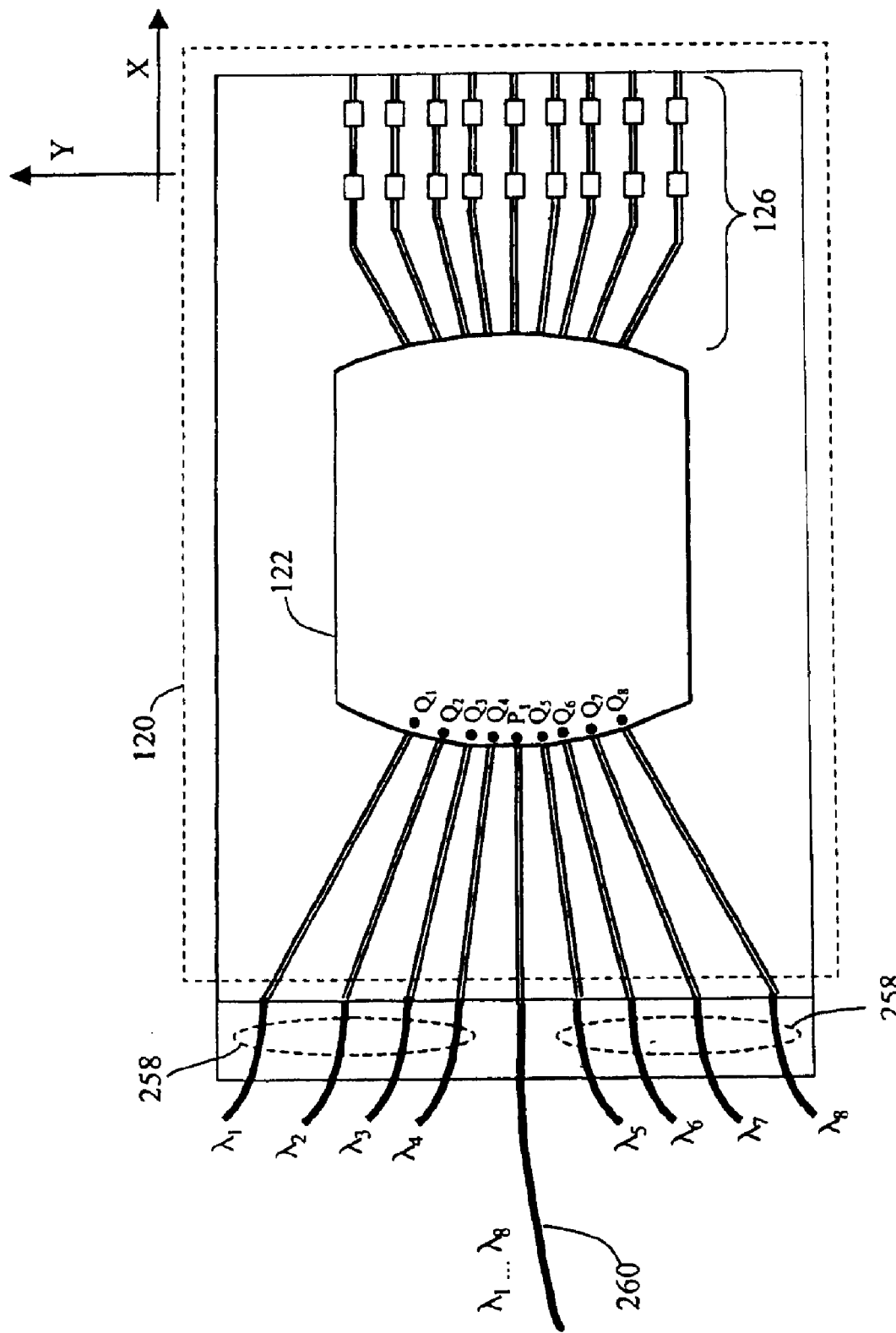

Referring to FIG. 21, a tunable dispersion compensator 120 may be used as a multiplexer or a demultiplexer. When compensator 120 is used as a multiplexer, lightwave signals from eight channels having center wavelengths $\lambda_1$ to $\lambda_8$ enter compensator 120 through optical fibers 258. The lightwave signals travel round-trip through free propagation region 122 and adjustment region 126. As the lightwave signals pass through adjustment region 126, the phase and amplitude of the light wave signals are adjusted to compensate for chromatic dispersion. The lightwave signals are focused at a point $P_1$ and propagate through a single fiber 260 away from the compensator 120.

When compensator 120 is used as a demultiplexer, lightwave signals from eight channels having center wavelengths $\lambda_1$ to $\lambda_8$ enter compensator 120 through optical fiber 260. The lightwave signals travel round-trip through free propagation region 122 and adjustment region 126. As the lightwave signals pass through adjustment region 126, the phase and amplitude of the light wave signals are adjusted to compensate for chromatic dispersion. The lightwave signals belonging to channels having center wavelengths $\lambda_1$ to $\lambda_8$ are focused at points $Q_1$ to $Q_8$, respectively, and propagate through fibers 258 away from the compensator 120.

Each of the tunable dispersion compensators of FIGS. 2, 3, and 13 may be modified to function as a signal multiplexer or demultiplexer by removing the detector and adding an optical fiber to couple the lightwave signals into or out of the compensator. Each of the tunable dispersion compensators of FIGS. 15, 16, and 19 may be used as a signal multiplexer of demultiplexer. These multiplexers/demultiplexers, in addition to multiplexing/demultiplexing the signals, also compensate chromatic dispersions in the signals.

The tunable dispersion compensators of FIGS. 17 and 20 may also be modified to function as multiplexers/demultiplexers by adding more waveguides to couple signals from additional channels into or out of the compensators. When used as a multiplexer, the mirror assemblies 196 and 234 are arranged so that signals from the input waveguides (or fibers) are reflected toward the output waveguide (or fiber). When used as a demultiplexer, the mirror assemblies 196 and 234 are arranged so that the signals of different channels entering the compensator through the input waveguide (or fiber) are reflected toward respective output waveguides (or fibers).

Figure 22:
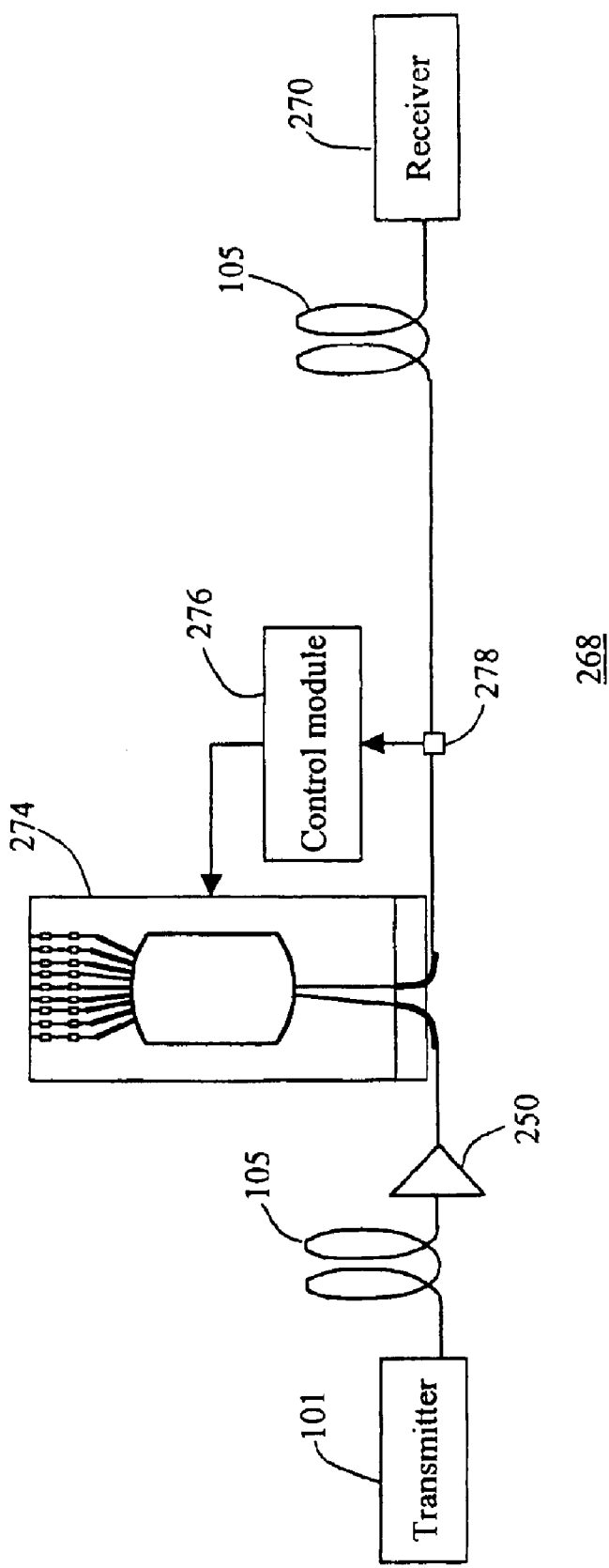
FIGS. 22 and 23 are optical communications systems that include one or more tunable dispersion compensators.

Referring to FIG. 22, an optical communication system 268 includes a transmitter 101 that sends lightwave signals through optical fiber 105 to a receiver 270. Between segments of optical fiber 105 is an optical amplifier 250 (e.g., erbium-doped fiber amplifier) that increases signal strength, a tunable dispersion compensator 274, and a control module 276 that controls the amount of phase shifts and attenuations applied to light waves traveling in the adjustment region of tunable dispersion compensator 274. Control module 276 obtains a small portion of the output signal of the tunable dispersion compensator 274 from an optical tap 278. Control module 276 analyzes the signals obtained from optical tap 278 and controls the phase shifters and attenuators of tunable dispersion compensator 274 so that an optimum Q value and a flattened gain spectrum are obtained.

In one example, optical amplifier 250 may be substituted with a semiconductor optical amplifier that is integrated on the same substrate as tunable dispersion compensator 274. Control module 276 controls the adjustment region of the tunable dispersion compensator and the semiconductor optical amplifier to provide automatic gain adjustment so that the level of the output lightwave signal is maintained at a predetermined level.

In another example, a detector and a transimpedance amplifier may be integrated with the tunable dispersion compensator. This can be used at the receiver end to convert the output lightwave signal into an electrical signal. A control module controls the adjustment region of the tunable dispersion compensator and an optical amplifier to provide automatic gain adjustment so that the level of the electrical signal is maintained at a predetermined level.

Figure 23:
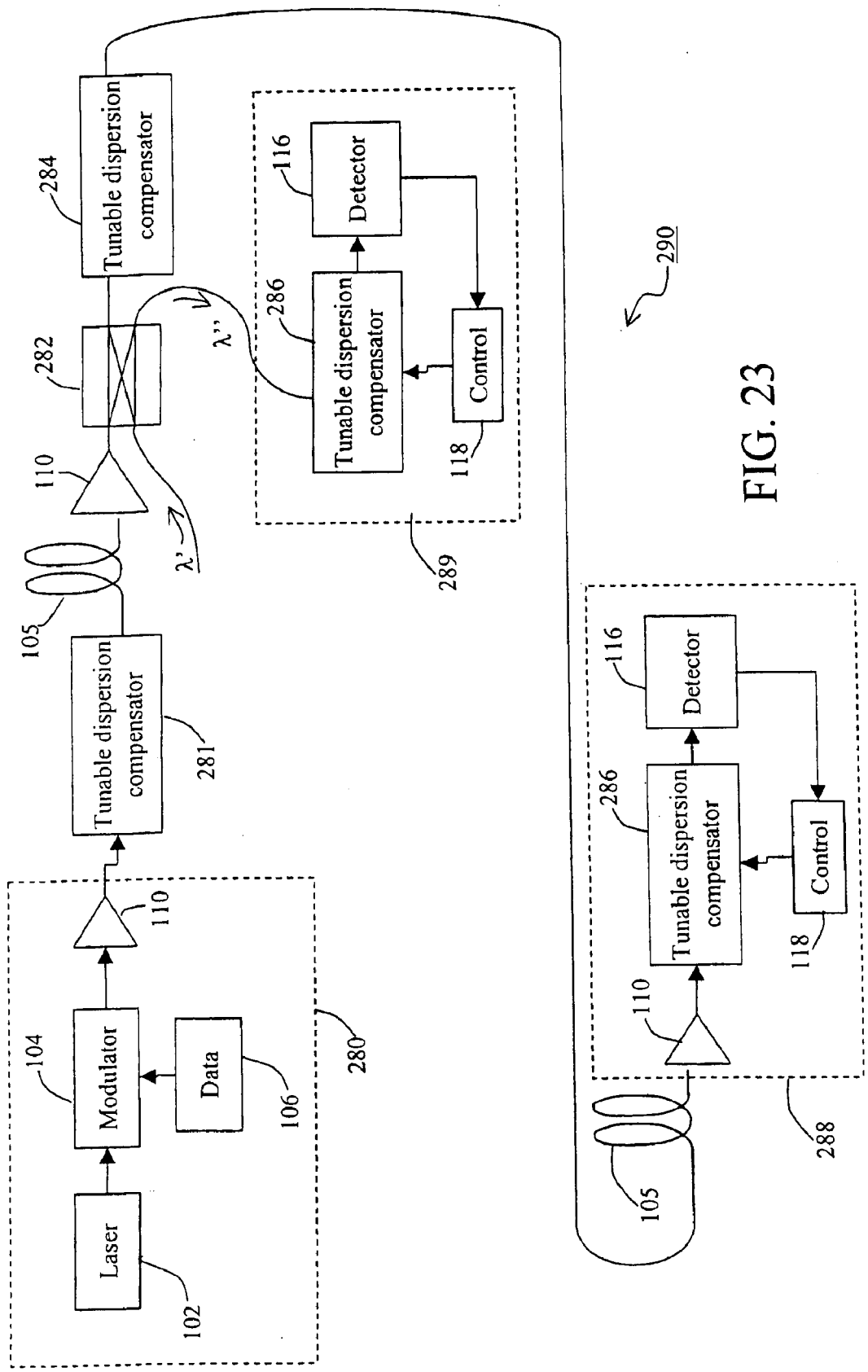

Referring to FIG. 23, an example of an optical communication system 290 includes a transmitter 280 that transmits lightwave signals through an optical fiber 105 to a receiver 288. Transmitter 280 includes a laser 102, a modulator 104 that modulates the lightwave signals according to digital data 106, an amplifier 110, and a pre-chirp tunable dispersion compensator 281. Compensator 281 pre-chirps the lightwave signals to induce dispersion into the lightwave signals so as to cancel the dispersion imparted by the optical fiber 105. Compensator 281 may have phase shifters and attenuators that are manually adjustable. Compensator 281 may also use a design in which the phase shifters and attenuators are fixed.

System 290 includes one or more in-line tunable dispersion compensators 284 that have phase shifters and attenuators that are manually adjustable to compensate dispersion imparted to the lightwave signals as they travel through fiber 105. The phase shifters and attenuators in compensator 284 may also be fixed.

Receiver 288 has a tunable dispersion compensator 286 that is dynamically adjusted by control module 118 to compensate the dispersion not compensated by the pre-chirp compensator 281 and the in-line compensator 284.

System 290 includes an add/drop module 282 that allows insertion of additional lightwave signals $\lambda'$. Module 282 allows lightwave signals $\lambda''$ to be dropped and sent to a receiver 289. Receiver 289 may have the same configuration as receiver 288.

A number of embodiments of the invention have been described. Nevertheless, it will be understood that various modifications may be made without departing from the spirit and scope of the invention. For example, different types of attenuators and phase shifters may be used. The adjustment region may have functions other than to compensate dispersion effects and uneven gains. An adjustment region that is used to adjust other properties of the lightwave signals may be used. The free propagation region may have different shapes. The phase shift and attenuation profiles of the tunable dispersion compensator may be adjusted depending on the material used for the optical fiber. The phase shifters and attenuators in the tunable dispersion compensators of FIG. 23 may be automatically adjustable. Accordingly, other embodiments are within the scope of the following claims.

What is claimed is:

1. An apparatus comprising:
    a free propagation region to propagate an input lightwave signal having component signals with different wavelengths from a first end of the free propagation region to a second end of the free propagation region; and
    an adjustment region, which receives portions of the input lightwave signal, adjusts a characteristic of the portions of the input lightwave signal at the second end and directs the adjusted portions of the input lightwave signal back towards the first end, so that the adjusted portions of the input lightwave signal combine at the first end to generate an output lightwave signal having a phase profile that is different from a phase profile of the input lightwave signal.

2. The apparatus of claim 1, wherein the adjustment region comprises a plurality of phase shifters having first ends optically coupled to a portion of the second end of the free propagation region to receive portions of the input lightwave signal, the phase shifters disposed to adjust the phases of portions of the lightwave signals traveling through the adjustment region.

3. The apparatus of claim 2, wherein the adjustment region comprises waveguides having different optical lengths to couple the input lightwave signal at the second end of the free propagation region to the tunable phase shifters.

4. The apparatus of claim 3, wherein each waveguide forms a 90 degree arc.

5. The apparatus of claim 3, wherein each waveguide forms a 180 degree arc.

6. The apparatus of claim 3, wherein the waveguides have different widths resulting in different effective refractive indices, each waveguide to couple a portion of the input lightwave signal at the second end of the free propagation region to one of the phase shifters.

7. The apparatus of claim 3, wherein the waveguides are doped with different amounts of impurities resulting in different effective refractive indices, each waveguide to couple a portion of the input lightwave signal at the second end of the free propagation region to one of the phase shifters.

8. The apparatus of claim 2, wherein the phase shifters are adjustable.

9. The apparatus of claim 8, further comprising a control module to measure the output lightwave signal and adjusts the phase shifters to impart phase shifts to portions of the input lightwave signal to reduce dispersion in the output lightwave signal.

10. The apparatus of claim 9, wherein the control module controls the tunable phase shifters based on measurements of a bit error rate of the output lightwave signal.

11. The apparatus of claim 1, wherein the adjustment region comprises mirrors to reflect portions of the input lightwave signal received at the second end of the free propagation region.

12. The apparatus of claim 11, wherein the mirrors comprise dielectric-coated mirrors.

13. The apparatus of claim 11, wherein the mirrors comprise Faraday rotator mirrors.

14. The apparatus of claim 11, wherein the mirrors have different reflectivities so as to impart different attenuations to the portions of the input lightwave signal reflected by the mirrors.

15. The apparatus of claim 1, wherein the adjustment region comprises attenuators to adjust the amplitude of portions of the input lightwave signal at the second end of the free propagation region.

16. The apparatus of claim 15, wherein the attenuators are adjustable.

17. The apparatus of claim 16, further comprising a control module to measure the output lightwave signal and adjusts the attenuators to attenuate portions of the input lightwave signal to reduce ripple in a dispersion profile of the output lightwave signal.

18. The apparatus of claim 1, further comprising a semiconductor optical amplifier.

19. The apparatus of claim 1, further comprising a detector to convert the output lightwave signal into an electrical signal.

20. The apparatus of claim 1, further comprising a waveguide to guide the input lightwave signal to the first end of the free propagation region.

21. The apparatus of claim 1, wherein the free propagation region and the adjustment region are supported by a planar substrate.

22. An apparatus comprising:
a waveguide to guide an input lightwave signal having component signals with different wavelengths, the waveguide having an end to allow the input lightwave signal to exit the waveguide; and
mirrors spaced from the end of the waveguide and oriented to reflect a portion of the input lightwave signal, the mirrors positioned so that reflected lightwave signals combine to generate an output lightwave signal with a phase profile different from a phase profile of the input lightwave signal.

23. The apparatus of claim 22, wherein the position of each mirror is adjustable.

24. The apparatus of claim 23, wherein the positions of the mirrors are adjusted to impart phase shifts to portions of the input lightwave signal to reduce dispersion in the output lightwave signal.

25. The apparatus of claim 22, wherein each mirror is initially positioned along an arc with the concave side of the arc facing towards the end of the waveguide.

26. The apparatus of claim 22, wherein each mirror comprises a microelectromechanical mirror.

27. An apparatus comprising:
a waveguide to guide an input lightwave signal having component signals with different wavelengths, the waveguide having an end to allow the input lightwave signal to exit the waveguide;
mirrors spaced from the end of the waveguide and oriented to reflect a portion of the input lightwave signal, the mirrors positioned so that reflected lightwave signals combine to generate an output lightwave signal with a phase profile different from a phase profile of the input lightwave signal; and
a light source to generate the input lightwave signal.

28. The apparatus of claim 27, further comprising an amplifier to amplify the output lightwave signal.

29. An apparatus comprising:
a free propagation region to propagate an input lightwave signal having component signals with different wavelengths from a first end of the free propagation region to a second end of the free propagation region;
an adjustment region, which receives portions of the input lightwave signal, adjusts a characteristic of the portions of the input lightwave signal at the second end and directs the adjusted portions of the input lightwave signal back towards the first end, so that the adjusted portions of the input lightwave signal combine at the first end to generate an output lightwave signal having a phase profile that is different from a phase profile of the input lightwave signal; and
a light source to generate the input lightwave signal.

30. The apparatus of claim 29, further comprising an amplifier to amplify the output lightwave signal.

31. An apparatus comprising:
a substrate;
a first set of waveguides supported by the substrate to receive input lightwave signals;
a dielectric slab supported by the substrate, the dielectric slab having a first end and a second end, the first end coupled to the first set of waveguides to receive the input lightwave signals, the dielectric slab allowing the input lightwave to propagate from the first end to the second end; and an adjustment region, which is supported by the substrate and coupled to the second end of the dielectric slab, that receives portions of the input lightwave signal, adjusts a characteristic of the portions of the input lightwave signal at the second end of the dielectric slab, and directs the adjusted portions of the input lightwave signal back towards the first end, so that the adjusted portions of the input lightwave signal combine at the first end to generate an output lightwave signal having a phase profile that is different from a phase profile of the input lightwave signal.

32. The apparatus of claim 31, wherein the adjustment region includes a second set of waveguides having different optical lengths.

33. The apparatus of claim 32, wherein the adjustment region further includes an array of tunable phase shifters, each tunable phase shifter to impart phase shift to light waves traveling through a corresponding one of the second set of waveguides.

34. The apparatus of claim 32, wherein the adjustment region further includes an array of optical attenuators, each optical attenuator to attenuate light waves traveling through a corresponding one of the second set of waveguides.

35. The apparatus of claim 34, wherein the adjustment region further includes an array of mirrors, each mirror to reflect light waves traveling through a corresponding one of the second set of waveguides.

36. An apparatus, comprising:
a substrate;
an input waveguide supported by the substrate to receive an input lightwave signal comprising signals from a first channel and a second channel;
a first output waveguide and a second output waveguide supported by the substrate;
a propagation region supported by the substrate to allow an input lightwave signal to expand in a direction transverse to a propagation direction as the signal propagates from a first end of the propagation region to a second end of the propagation region, the first end being coupled to the input and output waveguides;
an array of waveguides having different optical lengths and supported by the substrate, each waveguide having a first end coupled to the second end of the propagation region;
an array of tunable phase shifters, each corresponding to a waveguide of the array; and
optics to redirect lightwave signals that propagate in a forward direction through the array of waveguides and the array of tunable phase shifters so that redirected lightwave signals propagate in a reverse direction through the tunable phase shifters and the array of waveguides and from the second end to the first end of the slab;
wherein the propagation region, the array of waveguides, and the array of tunable phase shifters are configured so that signals from the first channel recombine at the first end of the propagation region and enter the first output waveguide, and signals from the second channel recombine at the first end of the propagation region and enter the second output waveguide, and
wherein the tunable phase shifters are controlled to impart phase shifts to the input lightwave signal so that the signals in the first and second output waveguides have a different dispersion.

37. The apparatus of claim 36, further comprising an array of tunable attenuators, each corresponding to a waveguide of the array, the tunable attenuators controlled to impart different amounts of attenuations to different portions of the input lightwave signal to reduce ripple in the dispersion profiles of the signals in the first and second output waveguides.

38. An apparatus comprising:
a free propagation region to propagate an input lightwave signal having a band of wavelengths from a first end of the free propagation region to a second end of the free propagation region; and
an adjustment region, which receives portions of the input lightwave signal, adjusts a characteristic of the portions of the input lightwave signal at the second end and directs the adjusted portions of the input lightwave signal back towards the first end so that the adjusted portions of the input lightwave signal combine at the first end to generate an output lightwave signal having an amplitude profile that is different from the amplitude profile of the input lightwave signal.

39. The apparatus of claim 38, wherein the adjustment region comprises an array of waveguides having different optical lengths, each waveguide having a first end coupled to the second end of the free propagation region.

40. The apparatus of claim 39, wherein the adjustment region includes an array of optical attenuators, each optical attenuator to attenuate light waves traveling through a corresponding one of the waveguides in the array of waveguides.

41. The apparatus of claim 40, wherein the optical attenuators impart an attenuation profile that is complementary to a gain profile of an optical amplifier.

42. An apparatus comprising:
a planar substrate;
means for guiding an input lightwave signal above the substrate;
means for separating the input lightwave signal into components having different wavelengths so that the different components appear at different spatial positions above the substrate;
means for redirecting the input lightwave signal so that the signal propagates in a reverse direction;
means for combining the redirected lightwave signal to generate an output lightwave signal; and
means for adjusting one or more characteristics of the components of the input lightwave signal so that the output lightwave signal has a phase profile different from a phase profile of the input lightwave signal.

43. The apparatus of claim 42, wherein the adjusting means adjusts one or more characteristics of the components of the input lightwave signal so that the output lightwave signal has a phase profile that tends to reduce chromatic dispersion in the output lightwave signal.

44. A method comprising:
transmitting an input lightwave signal having component signals with different wavelengths from a first end of a free propagation region to a second end of the free propagation region;
redirecting portions of the input lightwave signal at the second end so that redirected portions of input lightwave signals propagate away from the second end and combine at the first end to generate an output lightwave signal; and
modifying the phases of the portions of the input lightwave signal at the second end so that the output lightwave signal has a phase profile that is different from a phase profile of the input lightwave signal.

45. The method of claim 44, further comprising expanding the input lightwave signal in a direction transverse to the propagation direction of the signal as the signal propagates from the first end to the second end of the free propagation region.

46. The method of claim 44, further comprising modifying the amplitude of the portions of the input lightwave signals.

47. A method comprising:
generating a first lightwave signal that includes a band of wavelengths;
propagating the first lightwave signal from a first end of a free propagation region to a second end of the free propagation region;
propagating the first lightwave signal from a first end of an adjustment region to a second end of the adjustment region;
redirecting the first lightwave signal at the second end of the adjustment region so that redirected first lightwave signals travel from the second end of the adjustment region to the first end of the adjustment region, and from the second end of the free propagation region to the first end of the free propagation region;
combining the redirected first lightwave signal at the first end of the free propagation region to generate a second lightwave signal; and
imparting different phase shifts to different portions of the first lightwave signal as the first lightwave signal travels through the adjustment region so that the second lightwave signal has a phase profile that is different from a phase profile of the first lightwave signal before the first lightwave signal is transmitted through the free propagation region.

48. The method of claim 47, further comprising adjusting the amount of phase shifts imparted to the different portions of the first lightwave signal so that the second lightwave signal has a dispersion that is different compared to the first lightwave signal before the first lightwave signal is transmitted through the free propagation region.

49. The method of claim 48, wherein the different amounts of attenuation have a profile configured to reduce the ripple in a dispersion profile of the second lightwave signal.

50. The method of claim 47, further comprising imparting different amounts of attenuation to different portions of the first lightwave signal as the first lightwave signal travels through the adjustment region so that the second lightwave signal has an amplitude profile that is different from an amplitude profile of the first lightwave signal.

51. A method comprising:
receiving a first lightwave signal that includes a band of wavelengths;
propagating the first lightwave signal from a first end of a free propagation region to a second end of the free propagation region;
propagating the first lightwave signal from a first end of an adjustment region to a second end of the adjustment region;
redirecting portions of the input lightwave signal at the second end so that redirected portions of input lightwave signals travel from the second end of the adjustment region to the first end of the adjustment region, and from the second end of the free propagation region to the first end of the free propagation region;
combining the redirected first lightwave signal at the first end of the free propagation region to generate a second lightwave signal; and
imparting different phase shifts to different portions of the first lightwave signal as the first lightwave signal travels through the adjustment region so that the second lightwave signal has a phase profile that is different from a phase profile of the first lightwave signal before the first lightwave signal is transmitted through the free propagation region.

52. The method of claim 51, further comprising adjusting the amount of phase shifts imparted to the different portions of the first lightwave signal so that the second lightwave signal has a dispersion that is different compared to the first lightwave signal before the first lightwave signal is transmitted through the free propagation region.

53. The method of claim 52, wherein the different amounts of attenuation have a profile configured to reduce the ripple in a dispersion profile of the second lightwave signal.

54. The method of claim 51, further comprising imparting different amounts of attenuation to different portions of the first lightwave signal as the first lightwave signal travels through the adjustment region so that the second lightwave signal has an amplitude profile that is different from an amplitude profile of the first lightwave signal.

55. A method comprising:
propagating a first lightwave signal having a band of wavelengths from a first end of a free propagation region to a second end of the free propagation region;
propagating the first lightwave signal from a first end of an adjustment region to a second end of the adjustment region;
redirecting the first lightwave signal at the second end of the adjustment region so that redirected first lightwave signals travel from the second end of the adjustment region to the first end of the adjustment region, and from the second end of the free propagation region to the first end of the free propagation region;
combining the redirected first lightwave signal at the first end of the free propagation region to generate a second lightwave signal; and
imparting different amounts of attenuation to different portions of the first lightwave signal as the first lightwave signal travels through the adjustment region so that the second lightwave signal has an amplitude profile that is different from an amplitude profile of the first lightwave signal before the first lightwave signal is transmitted through the free propagation region.

56. The method of claim 55, further comprising adjusting the amounts of attenuation so that the attenuation imparted to the first lightwave signal has a profile that is complementary to a gain profile of an optical amplifier.

57. A method comprising:
propagating an input lightwave signal having component signals with different wavelengths through a free propagation region;
using mirrors to reflect portions of the input lightwave signal so that reflected portions of the input lightwave signal propagate away from the mirrors and combine at a location to generate an output lightwave signal; and
adjusting positions of the mirrors to impart different amounts of phase shift to the portions of the input lightwave signal reflected by the mirrors so that the output lightwave signal has a phase profile that is different from a phase profile of the input lightwave signal before the input lightwave signal is propagated through the free propagation region.

58. The method of claim 57, wherein the mirrors comprise microelectromechanical mirrors.

59. The method of claim 57, further comprising adjusting positions of the mirrors so that the output lightwave signal has a dispersion that is different compared to the input lightwave signal before the input lightwave signal is propagated through the free propagation region.

60. The method of claim 57, further comprising imparting attenuation to the portions of the first lightwave signal reflected by the mirrors.

61. The method of claim 60, further comprising adjusting the amount of attenuation imparted to the portion of the first lightwave signal reflected by each mirror to reduce the ripple in a dispersion profile of the second lightwave signal.

* * * * *

UNITED STATES PATENT AND TRADEMARK OFFICE
CERTIFICATE OF CORRECTION

PATENT NO. : 6,947,633 B2
DATED : September 20, 2005
INVENTOR(S) : Harmeet Singh and Hamid R. Khazaei It is certified that error appears in the above-identified patent and that said Letters Patent is hereby corrected as shown below:

<u>Title page,</u>
Item [73], Assignee, should read -- Optivia Corporation, Acton, MA (US) --.

Signed and Sealed this

Twenty-second Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,947,633 B2
DATED : September 20, 2005
INVENTOR(S) : Harmeet Singh and Hamid R. Khazaei It is certified that error appears in the above-identified patent and that said Letters Patent is hereby corrected as shown below:

<u>Title page,</u>
Item [73], Assignee, should read -- Optovia Corporation, Acton, MA (US) --.

Signed and Sealed this

Eleventh Day of April, 2006

JON W. DUDAS
*Director of the United States Patent and Trademark Office*